(12) United States Patent
Park

(10) Patent No.: US 8,752,331 B1
(45) Date of Patent: Jun. 17, 2014

(54) AIR ROOTING SHELL

(76) Inventor: Hong Ku Park, Huntsville, AL (US)

( * ) Notice: Subject to any disclaimer, the term of this patent is extended or adjusted under 35 U.S.C. 154(b) by 214 days.

(21) Appl. No.: 13/466,734

(22) Filed: May 8, 2012

Related U.S. Application Data

(63) Continuation-in-part of application No. 12/389,883, filed on Feb. 20, 2009, now Pat. No. 8,171,669.

(51) Int. Cl.
*A01G 9/00* (2006.01)
(52) U.S. Cl.
USPC .................................... 47/79; 47/6
(58) Field of Classification Search
CPC ............................ A01G 9/00; A01G 9/1073
USPC .......... 47/1.01 R, 5.5, 6, 31.1, 32, 32.7, 32.8, 47/57.8, 65, 65.5, 66.1, 79, 901
IPC ........................................ A01G 9/00, 9/1073
See application file for complete search history.

(56) References Cited

U.S. PATENT DOCUMENTS

| | | | | |
|---|---|---|---|---|
| 3,052,062 | A | * | 9/1962 | Geisthoff ......................... 47/5.5 |
| 3,755,965 | A | * | 9/1973 | Emery ............................ 47/48.5 |
| 7,428,798 | B2 | * | 9/2008 | Abney, II ......................... 47/73 |
| 8,171,669 | B1 | * | 5/2012 | Park .................................. 47/32 |

FOREIGN PATENT DOCUMENTS

GB  2108813 A  *  5/1983  ............. A01G 9/00

* cited by examiner

*Primary Examiner* — Rob Swiatek
*Assistant Examiner* — Ebony Evans
(74) *Attorney, Agent, or Firm* — Angela Holt; Bradley Arant Boult Cummings LLP

(57) ABSTRACT

An air rooting shell comprises a first shell half mateable with a second shell half to form a shell for enclosing around a branch. The shell comprises a reservoir for containing planting medium and an upper lipped opening that receives the branch and collects and funnels water to the reservoir. A bottom opening is provided through which the lower portion of the branch may exit. Side openings on the shell may be used to enclose a branch in a horizontal orientation, while the upper lipped opening remains vertically oriented to receive water.

20 Claims, 19 Drawing Sheets

(Section A-A)

(Detail B)

AIR ROOTING SHELL

CROSS-REFERENCE TO RELATED APPLICATIONS

This application is a continuation-in-part of and claims the benefit of U.S. Non-Provisional application Ser. No. 12/389,883 titled "Air Rooting Shell" and filed on Feb. 20, 2009, the entire contents of which is herein incorporated by reference.

BACKGROUND

The present invention relates generally to an apparatus for rooting plants using an air layering method, and more particularly to an air rooting shell for enclosing a branch and encouraging the growth of new roots.

Air layering is a method of propagating plants in which roots are encouraged to grow on a branch of a plant in order to create a new plant. The method involves cutting an inch or two of the outermost layer of bark from around a branch, putting root grow medium on the cut branch, surrounding the cut portion with a moist rooting or planting medium, and enclosing the branch and planting medium. If the planting medium is kept moist, within from about four weeks to a few months, roots should begin to form on the branch. The branch can then be planted to create a new plant.

SUMMARY

An apparatus according to an embodiment of the present disclosure comprises a first shell half mateable with a second shell half to form a shell for enclosing around a branch. The shell comprises a reservoir for containing planting medium and an upper lipped opening that receives the branch and collects and funnels water to the reservoir. A bottom opening is provided through which the lower portion of the branch may exit. Side openings on the shell may be used to enclose a branch in a horizontal orientation, while the upper lipped opening remains vertically oriented to receive water. Although the term "branch" is used repeatedly herein, the air rooting shell disclosed herein is also used on main trunks of plants and stems of plants, and the term branch is not intended to be limiting in this regard.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein.

These and other embodiments of the present invention will also become readily apparent to those skilled in the art from the following detailed description of the embodiments having reference to the attached figures, the invention not being limited to any particular embodiment(s) disclosed.

Figure 1:
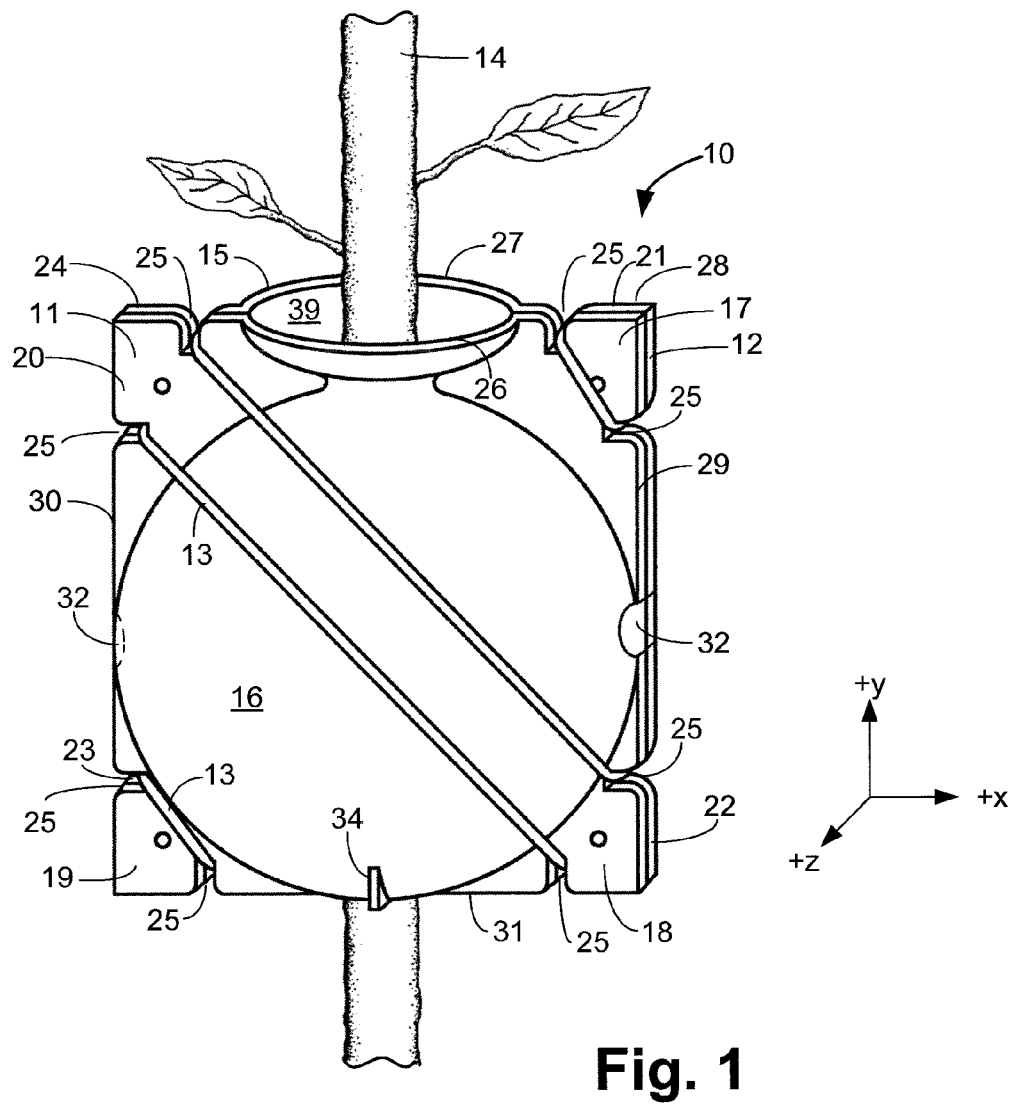
FIG. 1 is a perspective view of an air rooting shell according to an embodiment of the present disclosure.

Repeat use of reference characters throughout the present specification and appended drawings is intended to represent the same or analogous features or elements of the invention.

DETAILED DESCRIPTION

FIG. 1 depicts an exemplary embodiment of an air rooting shell 10 enclosing a branch 14. The air rooting shell 10 comprises a first shell half 11 and a second shell half 12 joined together around a branch 14 by one or more fasteners 13. The first shell half 11 and the second shell half 12 are substantially similar in this embodiment; therefore, the description herein of the first shell half 11 also applies to the second shell. When joined together, the first shell half 11 and the second shell half 12 are mirror images of each other. The first shell half 11 and the second shell half 12 may differ in other embodiments of the present disclosure.

The first shell half 11 and the second shell half 12 may be constructed from thin molded plastic or other suitable materials, such as composite, resin, metal, and the like. In one embodiment, the wall thickness of the first shell half 11 and the second shell half 12 is 1 millimeter. Other wall thicknesses may be used. Further, the material used to construct the first shell half 11 and the second shell half 12 may be transparent, such that the rooting medium (not shown) may be seen through the air rooting shell 10, or may be opaque.

The first shell half 11 comprises a convexly-shaped casing 16. In this embodiment, the convexly-shaped casing 16 is shaped as a hemisphere, though in other embodiments differently shaped casings may be used, such as oval, oblong, square, or polygonal. When the first shell half 11 of the illustrated embodiment is joined with the second shell half 12, the casing 16 of the first shell half 11 and the casing 16 of the second shell half 12 form a generally spherical hollow reservoir (not shown) for containing the branch 14 and the rooting medium (not shown), as further discussed herein. In one embodiment, the diameter of the generally spherical hollow reservoir is generally four (4) inches, though other dimensions are used in other embodiments.

The casing 16 is integral with and/or joined to corner flanges 17-20. In the illustrated embodiment, the corner flanges 17-20 are flat planar flanges located at the four corners of the first shell half 11. The corner flanges 17-20 are located in the same plane as one another, namely, the x-y plane. The corner flanges 17-20 contact mirror-imaged corner flanges 21-24 on the second shell half 12 as illustrated in FIG. 1.

A lip 15 is formed in a top side edge 28 of the air rooting shell 10 by curved edges 26 and 27 formed in the first and second hell halves 11 and 12, respectively. The lip 15 directs water into the generally spherical hollow reservoir of the air rooting shell 10. In the illustrated embodiment, the curved edges 26 and 27 are semi-circular in shape, forming a round lip 15 when the first shell half 11 is joined with the second shell half 12. The curved edges 26 and 27 may be differently-shaped in other embodiments. Further, a tapered inner wall 39 formed by the curved edges 26 and 27 is concave and gently tapers to an opening (not shown) in which the branch 14 enters the generally spherical hollow reservoir. The tapered inner wall 39 receives and directs water into the reservoir (not shown).

Side edges 29 and 30 are disposed on the right and left sides, respectively, of the first shell half 11. The side edges 29 and 30 are generally straight and are oriented generally in the +/−y direction when the air rooting shell 10 is installed around a branch 14 that is generally oriented in the +y direction, as shown. Each side edge 29 and 30 comprises a side knock-out tab 32 disposed generally mid-way down the side edges 29 and 30, as further discussed with reference to FIG. 7 herein.

A bottom side edge 31 is a generally straight edge disposed at the bottom of the first shell half 11. A bottom opening 33 (FIG. 2) is disposed on the bottom side edge 31 and permits the branch 14 to pass through the bottom side edge 31 of the first shell half 11 and the second shell half 12.

In the illustrated embodiment, a pedestal 34 is disposed on the bottom side edge 31. The pedestal 34 is a generally triangular protrusion that may be used to support the shell 10 when the shell 10 is used in a "standing" orientation, i.e., is not attached to the branch 14 that passes through the shell 10, but rather stands on a surface, as further discussed herein. Other embodiments may not include a pedestal 34, or may include a differently sized or shaped pedestal 34.

The corner flanges 17-20 and 21-24 comprise a plurality of grooves 25 for receiving the fasteners 13 that join the first shell half 11 to the second shell half 12. In the illustrated embodiment, the fasteners 13 are elastic (e.g., rubber) bands, though other types of fasteners may be used in other embodiments. The fasteners 13 loop through the grooves 25 and hold the first shell half 11 to the second shell half 12.

Figure 2:
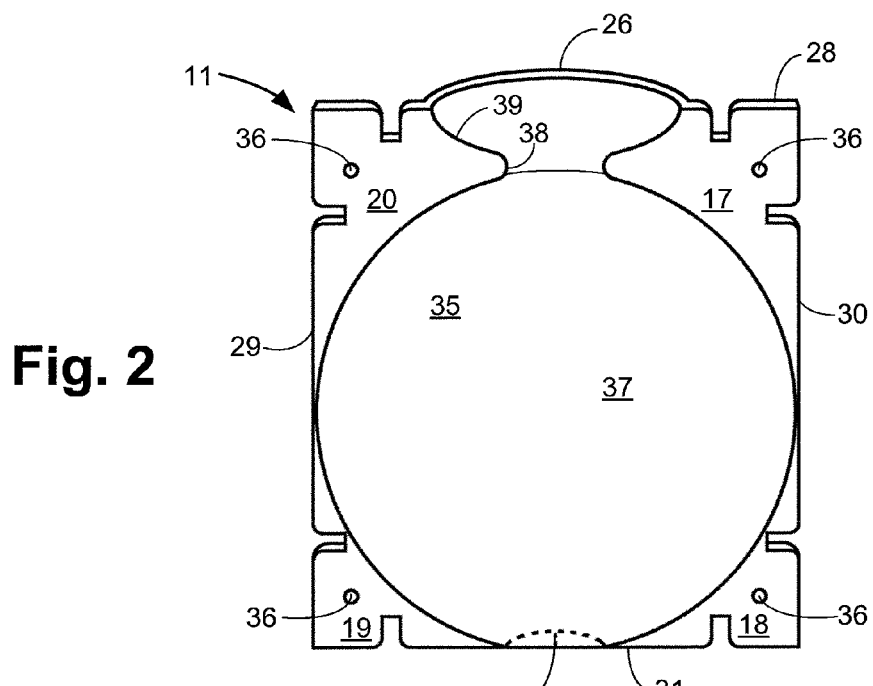
FIG. 2 is an inside perspective view of an exemplary half of the air rooting shell.

FIG. 2 is an inside perspective view of the embodiment of the first shell half 11 shown in FIG. 1, when the shell half 11 is not coupled to the shell half 12 (FIG. 1). A concave inside surface 35 of the casing 16 (FIG. 1) forms a reservoir 37 for containing a branch (not shown) and rooting medium (not shown). The curved edge 26 has a tapered inner wall 39 that forms a funnel shape with a neck opening 38. When the first shell half 11 is joined with the second shell half 12 (FIG. 1) such that the curved edge 26 abuts curved edge 27 to form the lip 15, water (not shown) may be funneled into the lip 15, through the neck opening 38, and into the reservoir 37.

Four (4) support holes 36 in the illustrated embodiment are disposed in the corner flanges 17-20 as shown. The support holes 36 may be used to attach the air rooting shell 10 (FIG. 1) to one or more supports (not shown) for supporting the air rooting shell 10, as further discussed herein.

Figure 8:
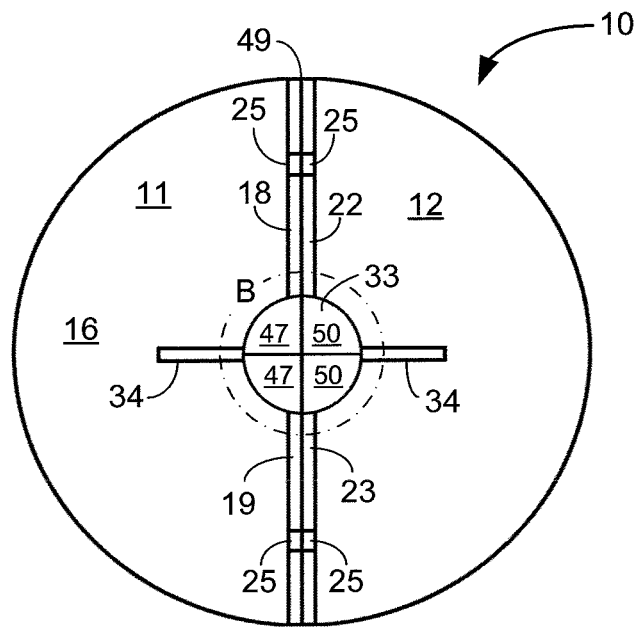
FIG. 8 is a bottom plan view of the air rooting shell of FIG. 1.

The first half shell 11 comprises a generally semi-circular opening 33. When the first shell half 11 is mated to the second shell half 12, the semi-circular opening 33 joins with a semi-circular opening (not shown) of shell half 12 to form a generally circular opening (FIG. 8). The branch 14 (FIG. 1) then extends through the formed opening.

Figure 3:
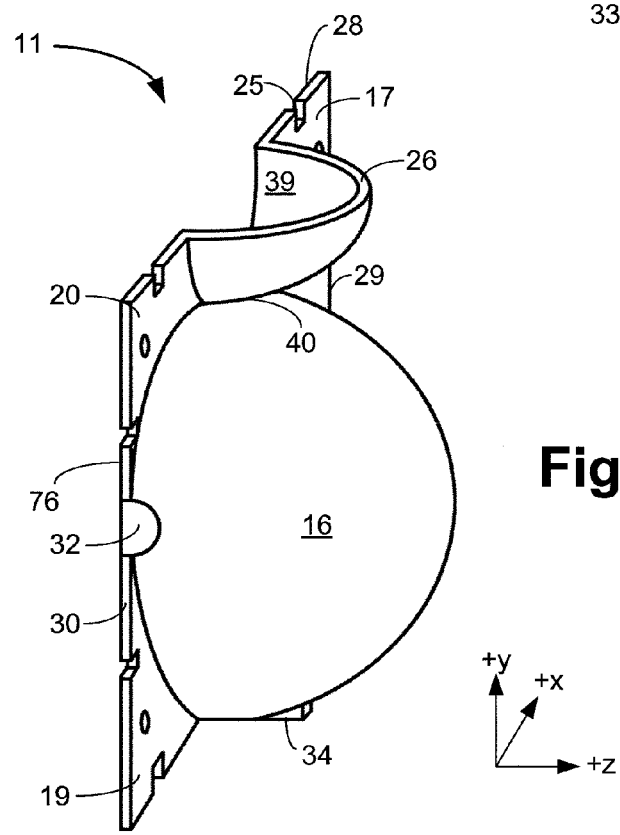
FIG. 3 is a front/side perspective view of the shell half of FIG. 2.

FIG. 3 further depicts the first shell half 11 of the air rooting shell 10 (FIG. 1). The casing 16 and the curved edge 26 protrude from the flat corner flanges 17, 19, 20, and 18 (FIG. 2) as shown. The curved edge 26 tapers down to a narrowed neck 40. The four corner flanges 17-20 are formed in the same plane, i.e., the x-y plane. A rear surface 76 of the first shell half 11 is generally flat, so that the first shell half 11 contacts the second shell half 12 (FIG. 1) along a generally flat mating surface (not shown).

Figure 4:
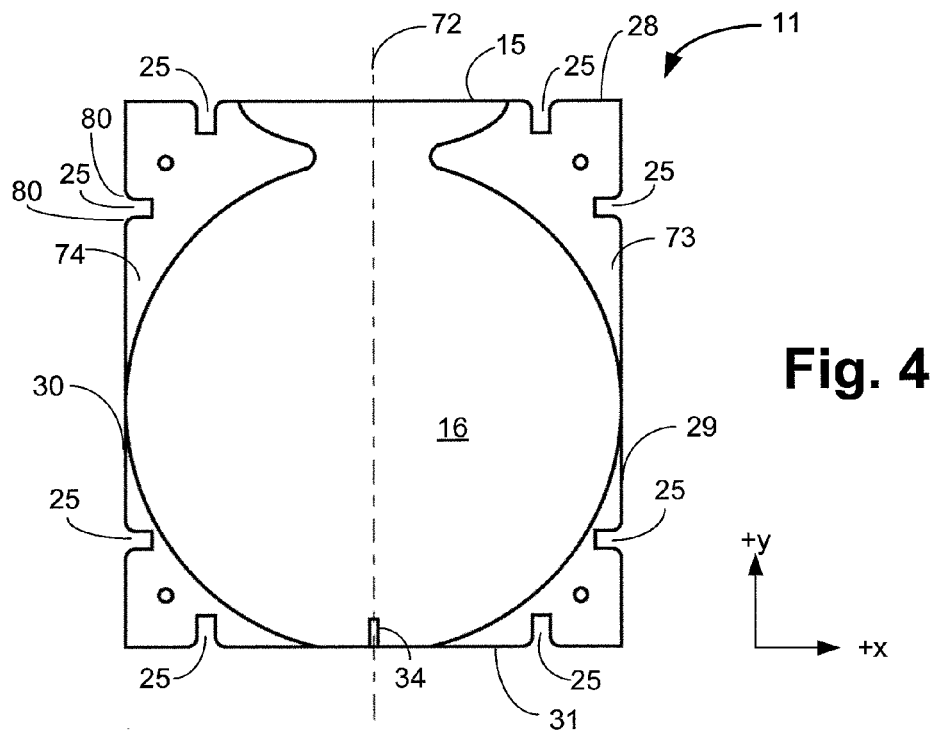
FIG. 4 is a front plan view of the shell half of FIG. 2.

FIG. 4 is a front plan view of the first shell half 11 of the air rooting shell 10 (FIG. 1). In this embodiment, the top side edge 28 is generally straight, except for the grooves 25 disposed along the top side edge 28. Note that while the lip 15 extends in the +z direction (FIG. 3), the lip 15 thus does not extend above the top side edge 28 in the +y direction in this embodiment. The top side edge 28, bottom side edge 31, and the side edges 29 and 30 form a generally rectangular shape, with the exception of the grooves 25 that recess into the edges 28-31. The grooves 25 have rounded outer corners 80, which permits easier installation and removal of the fasteners 13 (FIG. 1).

In the illustrated embodiment, a right side half 73 of the first shell half 11 is symmetrical around a central vertical axis 72 with a left side half 74 of the first shell half 11.

Figure 5:
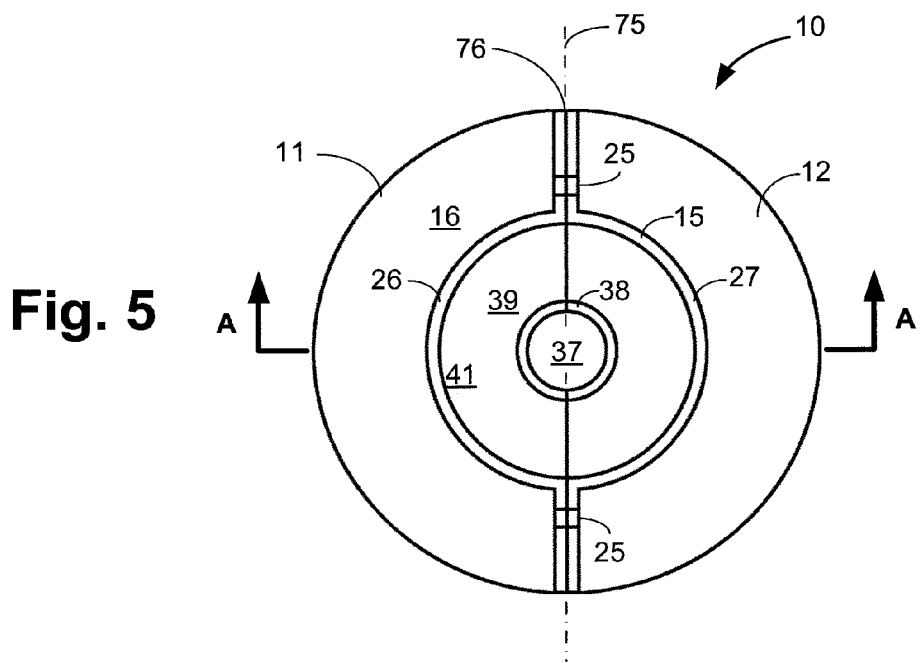
FIG. 5 is a top plan view of the air rooting shell of FIG. 1.

FIG. 5 is a top view of the embodiment of the air rooting shell 10 of FIG. 1 with the first shell half 11 joined to the second shell half 12. The lip 15 is formed by the curved edges 26 and 27, and has a top opening 41 that is flared for receiving water (not shown). The tapered inner wall 39 funnels down to the neck opening 38 which opens into the reservoir 37. In the illustrated embodiment, the lip 15 and the neck opening 38 are circular in shape. In other embodiments, different shapes may be employed for the lip 15 and the neck opening 38, such as oval, polygonal, and multi-faceted.

In this embodiment, the first shell half 11 is a mirror image of the second shell half 12, and the two shell halves 11 and 12 are thus symmetrical about a centerline 75 aligned with the rear surface 76 of the first shell half 11.

Figure 6:
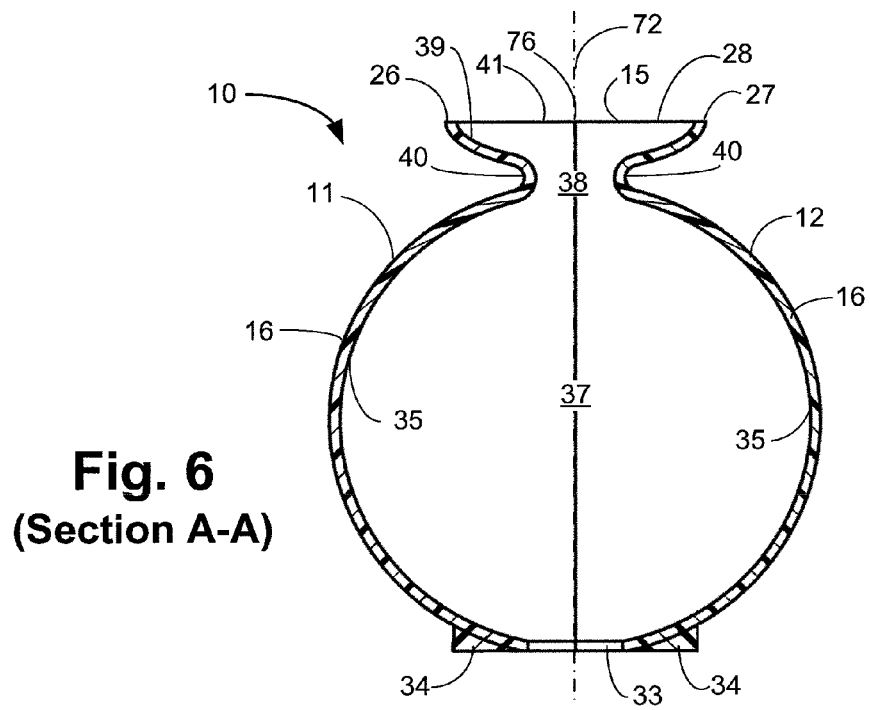
FIG. 6 is a cross-sectional plan view of the air rooting shell of FIG. 1, taken along section lines A-A of FIG. 5.

FIG. 6 is a cross-sectional view of the air rooting shell 10 of FIG. 4 taken along section lines "A-A" of FIG. 5. The inner walls 35 of the shell halves 11 and 12 when joined form the generally spherical reservoir 37. When the air rooting shell 10 is in use, water (not shown) that enters the top opening 41 will be funneled along the inner wall 39 of the lip 15 and will pass through the neck opening 38 and into the reservoir 37.

The neck opening 38 is sufficiently large such that the branch 14 (FIG. 1) may be disposed within it. The branch 14 is roughly cylindrical in shape and may pass longitudinally through the air rooting shell 10 (i.e., generally parallel to the center axis 72) and be enclosed within the neck opening 38. Likewise, the bottom opening 33 is sufficiently large that the branch 14 (FIG. 1) may be passed through it. The bottom opening 33 is generally aligned with the neck opening 38.

Figure 7:
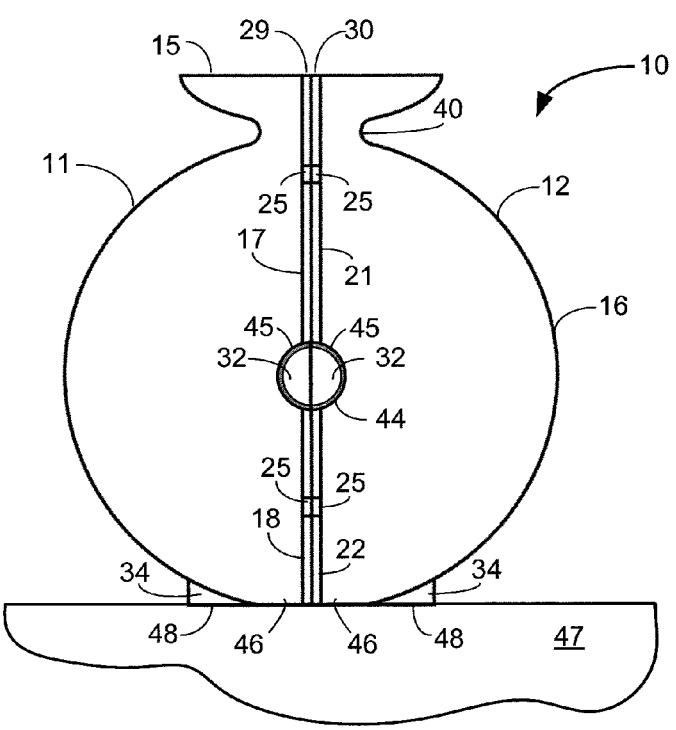
FIG. 7 is a side plan view of the air rooting shell of FIG. 1.

FIG. 7 is a side plan view of the air rooting shell 10 with the first shell half 11 and the second shell half 12 joined together. When the first shell half 11 is joined with the second shell half 12, the corner flange 17 of the first shell half 11 contacts the corner flange 21 of the second shell half 12, and the corner flange 18 of the first shell half 11 contacts the corner flange 22 of the second shell half 12. Likewise, although not shown in FIG. 7, the corner flange 19 (FIG. 1) of the first shell half 11 contacts the corner flange 23 (FIG. 1) of the second shell half 12 and the corner flange 20 (FIG. 1) of the first shell half 11 contacts the corner flange 24 (FIG. 1) of the second shell half 12. With the corners 17-20 of the first shell half 11 contacting and aligned with the corners 21-24 of the second shell half 12, the grooves 25 are aligned such that fasteners 13 (FIG. 1) may be installed to restrain the first and second shell halves 11 and 12 together, as further discussed herein.

In the illustrated embodiment, pedestals 34 are located on a lower surface 46 of each shell half 11 and 12. Each pedestal protrudes from the casing 16 and has a generally flat lower surface 48 that is generally parallel to and in the same plane as the bottom side edge 31 (FIG. 1).

The pedestals 34 support the air rooting shell 10 when the air rooting shell 10 is set upon a generally flat surface 44. The air rooting shell 10 may thus be used to root a plant cutting (not shown) that is placed within the air rooting shell 10 but that does not pass through the air rooting shell 10. The pedestals 34 stabilize the shell 10 and permit it to maintain a generally vertical orientation, i.e., with the lip 15 facing up.

In other embodiments, the shell halves 11 and 12 may have sufficiently flat lower surfaces 46 such that the air rooting shell 10 may be maintained in a vertical orientation without the need for pedestals 34 or other similar features.

In this embodiment, the side knock-out tabs 32 on the two halves 11 and 12 are semi-circular in shape with an outer groove 45 that permits the side knock-out tabs 32 to be "knocked out." The outer groove 45 comprises a groove and/or perforations cut into the shell halves 11 and 12. When the side knock-out tabs 32 are removed, a generally circular opening (not shown) is formed in the sides of the air rooting shell 10. The opening is located mid-way down the spherical portion of the air rooting shell 10, i.e., approximately 90 degrees from the lip 15.

Figure 12:
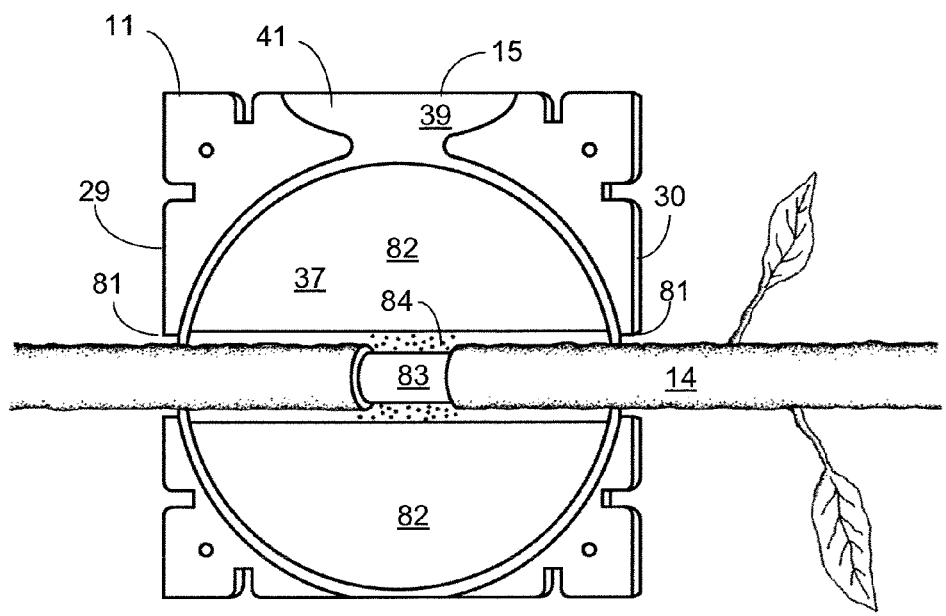
FIG. 12 is an inside plan view of an exemplary shell half of the air rooting shell of FIG. 1 in which the shell half has been installed on a generally horizontal branch.

A branch 14 (FIG. 1) may be passed through the opening (not shown) created by removing the side knock-out tabs 32 in the event the air rooting shell 10 is installed around a horizontally-oriented branch 14, as further discussed herein with reference to FIG. 12. In the illustrated embodiment, knock-out tabs 32 are used to create side openings (not shown) in the air rooting shell 10. Other configurations of side knock-out tabs may be used in other embodiments. Further, the air rooting shell 10 may be provided without any side knock-out tabs 32.

FIG. 8 is a bottom plan view of the air rooting shell 10 according to one embodiment of the disclosure. As was discussed above with respect to FIG. 7, when the first shell half 11 is joined with the second shell half, the corner flange 18 of the first shell half 11 and the corner flange 22 of the second shell half 12 contact one another. Similarly, the corner flange 19 of the first shell half 11 contacts the corner flange 23 of the second shell half 12. The grooves 25 are then aligned such that fasteners 13 (FIG. 1) may be installed to restrain the first shell half 11 in contact with the second shell half 12.

In this embodiment, the pedestals 34 on the first and second shell halves 11 and 12 are disposed at generally right angles to a seam 49 between the first shell half 11 and the second shell half 12. The pedestals 34 each comprise narrow rectangular-shaped protrusions (when viewed from the bottom, as in FIG. 8). In other embodiments, other types of pedestals may be employed to stabilize the air rooting shell 10 when it is set upon a surface.

The bottom opening 33 is disposed at the bottom center of the air rooting shell 10 in the illustrated embodiment. The bottom opening 33 is formed by two petals 47 on the first shell half 11 and two petals 50 on the second shell half 12. In this embodiment, the petals 47 and 50 are flexible such that they may flex outward when the air rooting shell 10 is enclosed around a branch 14 (FIG. 1).

Figure 9:
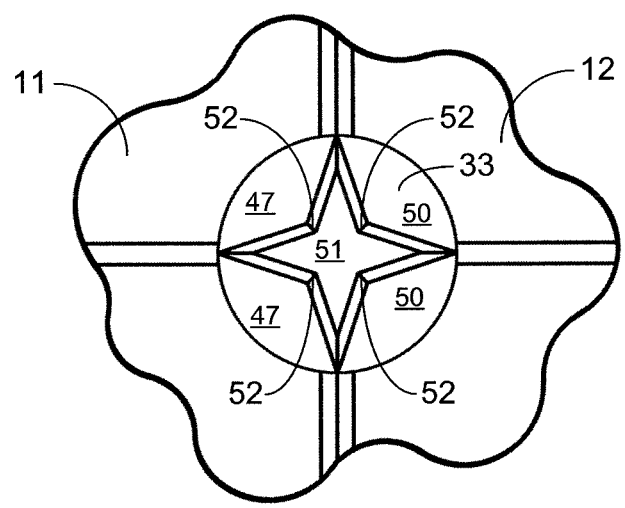
FIG. 9 is an enlarged bottom plan view showing an opening of the shell of FIG. 8, taken along Detail "B" of FIG. 8.

FIG. 9 is a detail view of the bottom opening 33 of FIG. 8, taken along Detail "B." The flexing of the petals 47 and 50 as described above is shown, as the petals 47 and 50 are flexed outward in this view to form an aperture 51 for receiving the branch 14 (FIG. 1). In operation of the air rooting shell 10 of FIG. 1, the branch 14 (FIG. 1) is generally still connected to a tree or plant when the air rooting shell 10 is installed around the branch 14. Therefore, the branch is not "pushed through" the bottom opening 33, but rather the branch is enclosed by the two shell halves 11 and 12 and enclosing the branch 14 will cause the petals 47 and 50 to flex and receive the branch 14.

The petals 47 and 50 comprise tips 52 which may remain in contact with the branch 14 (FIG. 1) when the branch 14 is enclosed within the air rooting shell 10. This contact helps to prevent the air rooting shell 10 from slipping on the branch 14.

Although four (4) petals are shown in FIG. 9 (two petals 47 on shell half 11 and two petals 50 on shell half 12), there may be more or fewer petals comprising the bottom opening 33 in other embodiments. Further, other embodiments may use other configurations for the bottom opening 33, such as a knock-out opening (not shown) as described with respect to the side knock-out tabs 32 discussed with respect to FIG. 7 above.

Figure 10:
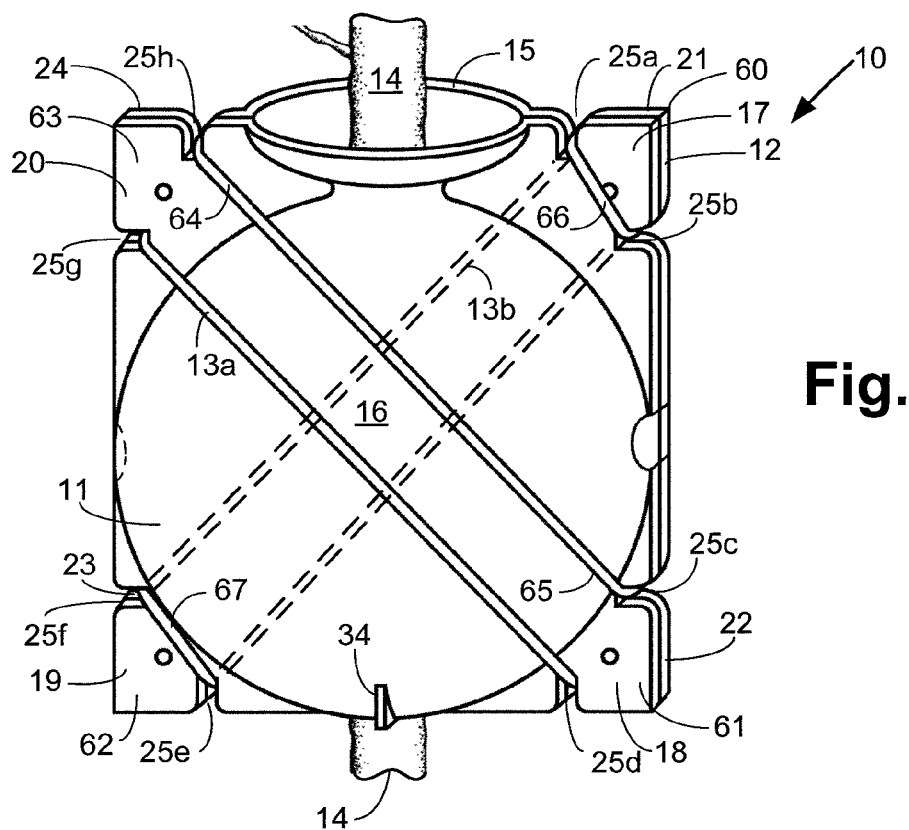
FIG. 10 is a front perspective view of the air rooting shell of FIG. 1 held together with rubber band-type fasteners.

FIG. 10 depicts the air rooting shell 10 with two rubber band-type fasteners 13a and 13b installed to hold the shell halves 11 and 12 together. In order to install the air rooting shell 10 around the branch 14, a user (not shown) installs the first shell half 11 and the second shell half 12 around the branch 14 such that the shell halves 11 and 12 are aligned and the branch 14 passes through the lip 15 and the bottom opening 33. When the shell halves 11 and 12 are properly aligned, the corner flange 17 of the first shell half 11 will contact and be aligned with the corner flange 21 of the shell half 12, forming a joined corner 60. Further, the corner flange 18 of the first shell half 11 will contact and be aligned with the corner flange 22 of the shell half 12, forming a joined corner 61. The corner flange 19 of the first shell half 11 will contact and be aligned with the corner flange 23 of the shell half 12, forming a joined corner 62. The corner flange 20 of the first shell half 11 will contact and be aligned with the corner flange 24 of the shell half 12, forming a joined corner 63.

The user may install the fastener 13a by looping an upper end 64 of the fastener 13a over a joined corner 63, such that the upper end 64 is received by grooves 25g and 25h and the fastener 13a extends diagonally across the first shell half 11, as illustrated in FIG. 10. The user may then loop a lower end 65 of the fastener 13a over the joined corner 61, such that the lower end 65 is received by grooves 25c and 25d. The fastener 13a will at this point hold the two shell halves 11 and 12 together around the branch 14.

The fastener 13b may be installed similarly to further secure the two shell halves 11 and 12 together. The user may by looping an upper end 66 of the fastener 13b over the joined corner 60, such that the upper end 66 is received by grooves 25a and 25b and the fastener 13a extends diagonally across the second shell half 12, as illustrated. The user may then loop a lower end 67 of the fastener 13b over the joined corner 62, such that the lower end 67 is received by grooves 25e and 25f.

FIG. 10 illustrates rubber band-type fasteners 13a and 13b which hold the shell halves 11 and 12 together elastically. Other types of fasteners may alternatively be used, such as friction-type clips, screws, wires, or ties.

Figure 11:
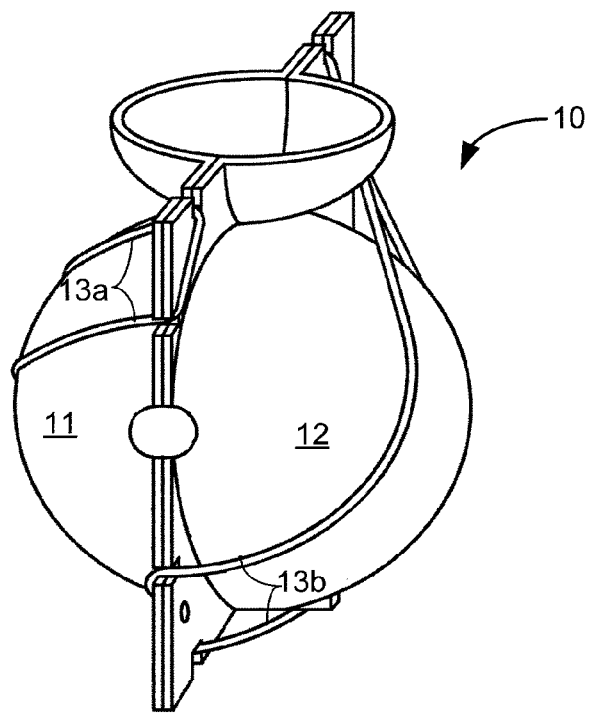
FIG. 11 is a side perspective view of the air rooting shell of FIG. 1 held together with rubber band-type fasteners.

FIG. 11 further depicts the fasteners 13a and 13b installed on the air rooting shell 10 to hold the shell halves 11 and 12 together.

FIG. 12 is an inside view of the first shell half 11 installed on the branch 14 when the branch 14 is installed through side openings 81. This configuration of the air rooting shell 10 may be desired when the branch 14 is in a generally horizontal or angled orientation (as opposed to being generally vertical). The side openings 81 have been created in the side edges 29 and 30 of the first shell half 11 by removing the knock-out tabs 32 (FIG. 7). The branch 14 is disposed within the side openings 81 with a scored portion 83 located generally centrally within the reservoir 37. With this configuration, the lip 15 may collect water (not shown) and provide it to the branch 14 even though the branch 14 is in a generally horizontal orientation.

In the illustrated embodiment, rooting medium 82 surrounds the branch 14. Root grow formula 84 has been placed around the scored portion 83 the branch 14 to promote the growth of roots (not shown) from the branch 14.

Figure 13:
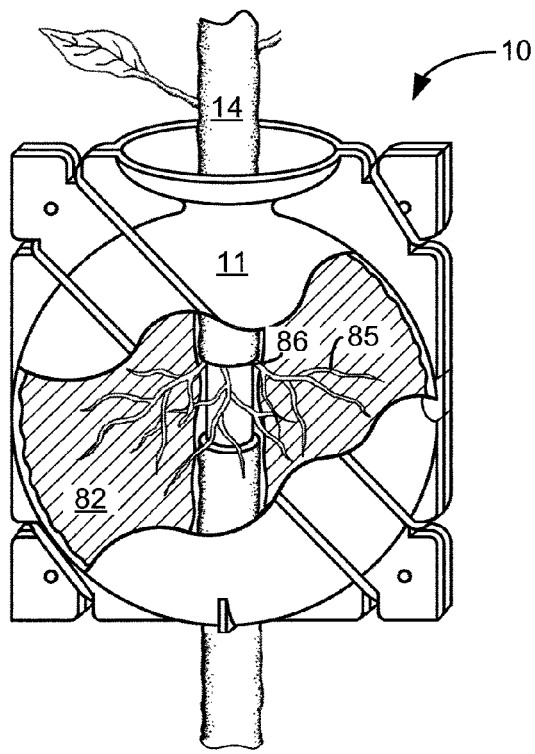
FIG. 13 is a front perspective view of the air rooting shell of FIG. 1 with a portion the air rooting shell removed to show roots emerging from a branch.

FIG. 13 depicts the air rooting shell 10 in which a portion of the first shell half 11 has been removed to show a sprouting branch 14 contained within the air rooting shell 10. Roots 85 have begun to form along the top edge 86 of the scored portion 83 of the branch 14.

Figure 14:
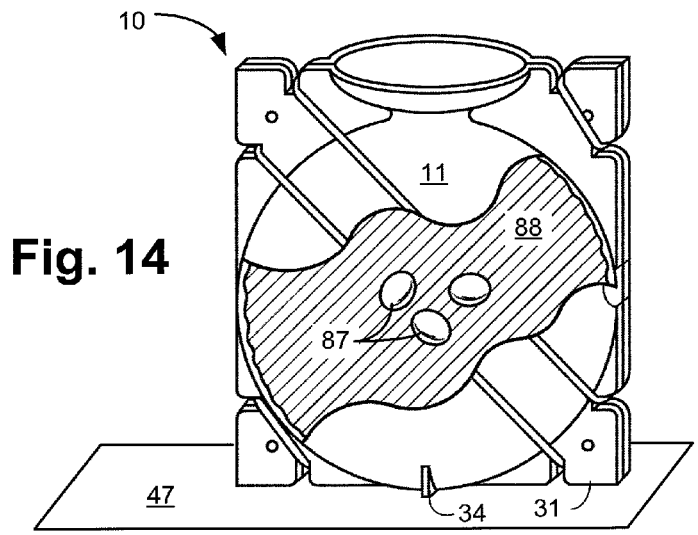
FIG. 14 is a front perspective view of the air rooting shell of FIG. 1 with a portion of the air rooting shell removed to show seeds planted within the shell.

FIG. 14 depicts an air rooting shell 10 in which a portion of the first shell half 11 has been removed to show seeds 87 that have been planted within the air rooting shell 10. In this embodiment, the shell 10 is placed upon a surface 47 such that the bottom side edge 31 and the pedestals 34 (only one shown in FIG. 14) support the shell 10 such that its lip 15 is upright for receiving moisture or water. The seeds 87 have been planted in a planting medium 88. In this embodiment, the shell 10 may be thus used in the manner of a traditional plant pot.

Figure 15:
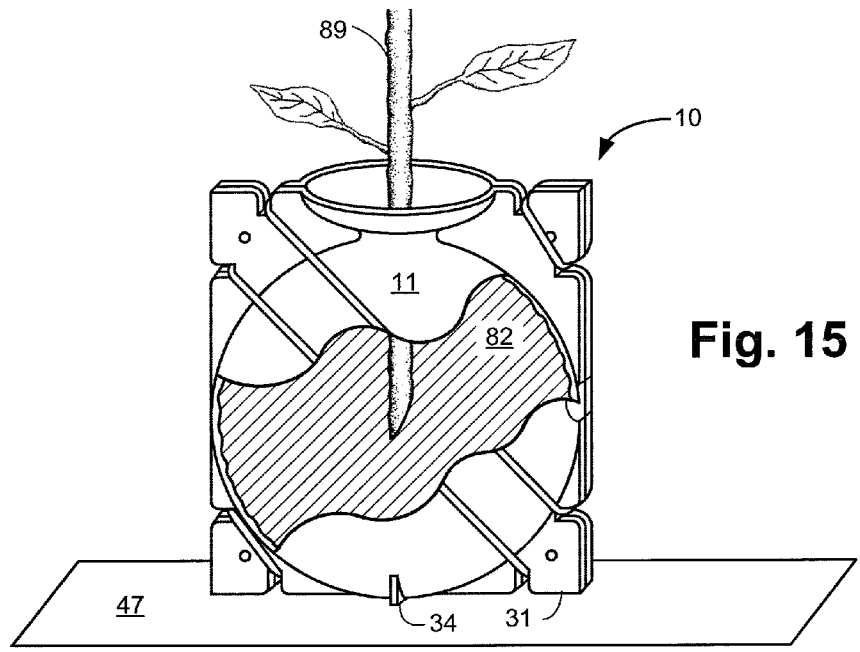
FIG. 15 is a front perspective view of the air rooting shell of FIG. 1 with a portion of the first air rooting shell removed to show a cut branch disposed within the shell.

FIG. 15 depicts an air rooting shell 10 in which a portion of the first shell half 11 has been removed to show a cut branch 89 (i.e., a branch that is no longer growing from the ground (not shown)) disposed within the air rooting shell 10. In this embodiment, the shell 10 is placed upon a surface 47 such that the bottom side edge 31 and the pedestals 34 (only one shown in FIG. 14) support the shell 10 in a generally vertical orientation. The shell 10 is thus usable to root cut branches in addition to rooting using an air layering method.

Figure 16:
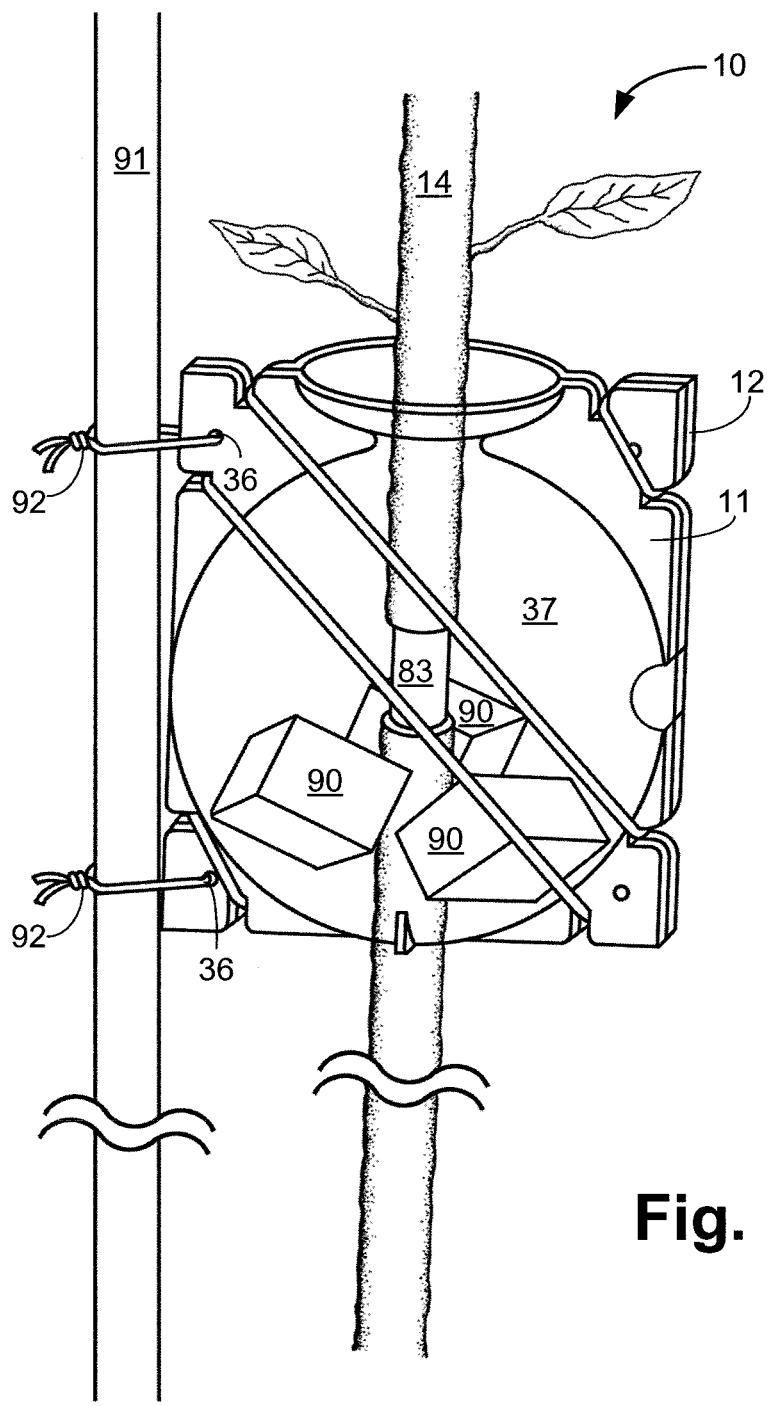
FIG. 16 is a front perspective view of the air rooting shell of FIG. 1 in which the shell is secured to a stake.

FIG. 16 depicts an embodiment of an air rooting shell 10 in which the first and second shell halves 11 and 12 are transparent. In this embodiment, blocks 90 of expandable planting medium are installed within the reservoir 37 around the branch 14. The blocks 90 expand and fill the reservoir 37 after water (not shown) is applied to the blocks 90.

A stake 91 supports the shell 10 in this embodiment. A plurality of fasteners 92, common twist ties in this embodiment, are passed through the support holes 36 and fastened to the stake 91.

Figure 17:
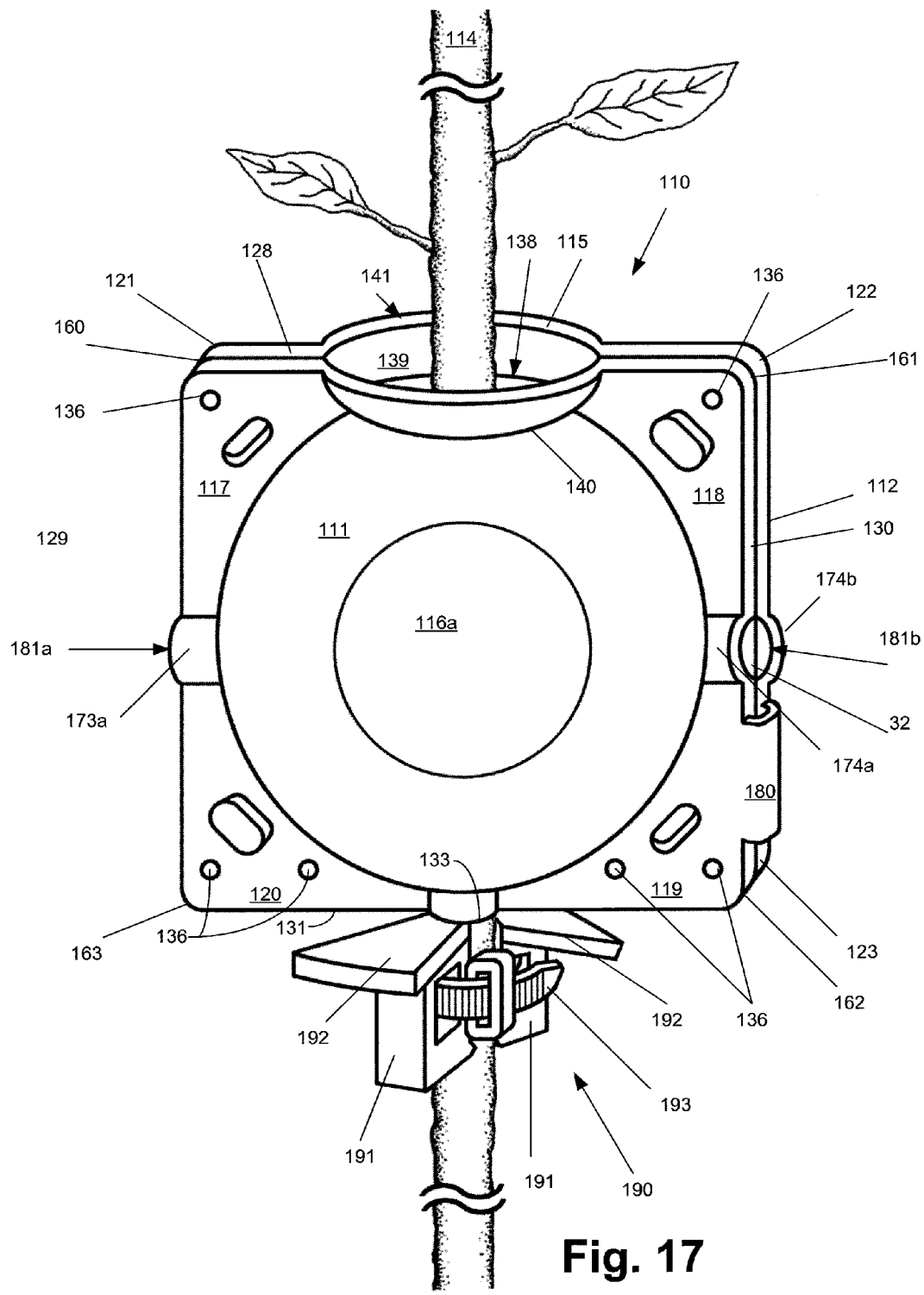
FIG. 17 is a front perspective view of an alternative embodiment of the air rooting shell enclosing a branch.

FIG. 17 depicts another embodiment of an air rooting shell 110. In this embodiment, the air rooting shell 110 has a first shell half 111 and a second shell half 112 molded from a single sheet of material, which is then folded around a branch 114 and secured to form the completed shell 110. Shell half 111 comprises a casing 116a which extends outwardly from the shell half 111. Similarly shell half 112 has a casing 116b (FIG. 19) which extends outwardly from the shell half 112. When the first shell half 111 is mated with the second shell half 112, the casing 116a of the first shell half 111 and the casing 116b of the second shell half 112 form a hollow reservoir 137 (shown in FIG. 18) for containing the branch 114 and the rooting medium 82 (shown in FIGS. 12 and 23), as further discussed herein.

The shell 110 has a top side edge 128, a hinge side edge 130, an open side edge 129, and a bottom side edge 131. The top side edge 128 and the bottom side edge 131 are generally parallel to each other in the illustrated embodiment. The hinge side edge 130 and the open side edge 129 are generally parallel to each other in the illustrated embodiment. The hinge side edge 130 and the open side edge 129 are generally perpendicular to the top side edge 128 and the bottom side edge 131 in the illustrated embodiment.

The shell half 111 comprises corner flanges 117-120. In the illustrated embodiment, the corner flanges 117-120 are flat co-planar flanges located at the four corners of the first shell half 111. In this regard, corner flange 117 is formed at the intersection of the top side edge 128 and the open side edge 129. The corner flange 118 is formed at the intersection of the top side edge 128 and the hinge side edge 130. The corner flange 119 is formed at the intersection of the hinge side edge 130 and the bottom side edge 131. The corner flange 120 is formed at the intersection of the bottom side edge 131 and the open side edge 129.

The corner flanges 117-120 contact mirror-imaged corner flanges 121-124 of the shell half 112. (Note that corner flange 124 is not shown in FIG. 17, but may be seen in FIG. 21.)

The corner flanges 117-120 are integral with and partially surround the casing 116. The corner flanges 117-120 on shell half 111 contact and align with the corresponding corners 121-124 of shell half 112. In this embodiment, corner 117 joins to corner 121 to form joined corner 160; corner 118 joins to corner 122 to form joined corner 161; corner 119 joins with corner 123 to form joined corner 162, and corner 120 joins with corner 124 (FIG. 21) to form joined corner 163.

Support holes 136 are disposed in the extremity of each corner flange 117-124 in the illustrated embodiment. These may be used to secure the air rooting shell 110 in the manner described above in reference to FIG. 16. Other embodiments do not include support holes 136.

Figure 18:
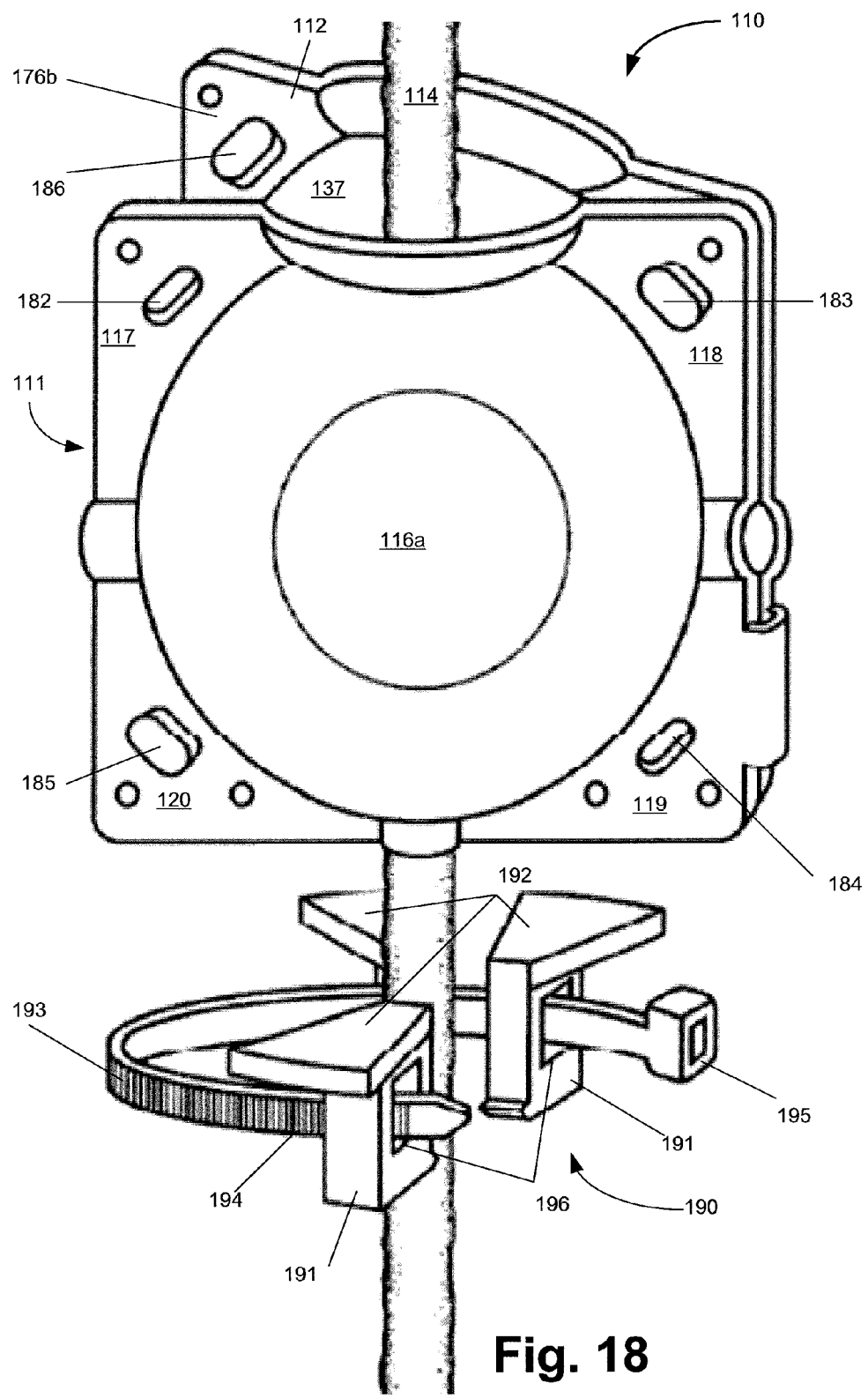
FIG. 18 is a front perspective view of the embodiment of FIG. 17 with the shell partially opened and set off from the base.

The shell 110 in this embodiment comprises a lip 115 defining a top opening 141 with a tapered inner wall 139 that progressively narrows to a neck edge 140 with a neck opening 138. The lip 115 and neck opening 138 receive and direct water into the reservoir 137 (FIG. 18).

Side openings 181a and 181b are disposed on opposed side edges 129 and 130, respectively, of the shell 110. The side opening 181a is formed from a concave ridge 173a on the shell half 111 along the open side edge 129 mating with a concave ridge 173b (FIG. 21) on the shell half 112. The concave ridges 173a and 173b mate together to form the generally circular side opening 181a. The side opening 181b is formed from a concave ridge 174a on the shell half 111 along the hinge side edge 129 mating with a concave ridge 174b on the shell half 112. The concave ridges 174a and 174b mated together form the generally circular side opening 181b. Although the side openings 181a and 181b in this embodiment are shown as circular, they may be in other cross-sectional shapes, such as oval, square, or polygonal. The side openings 181a and 181b in this embodiment are disposed midway along the open side edge 129 and hinge side edge 130, respectively, but the side openings 181a and 181b may be disposed at different locations along the open side edge 129 and the hinge side edge 130 without departing from the scope of the present disclosure.

Figure 24:
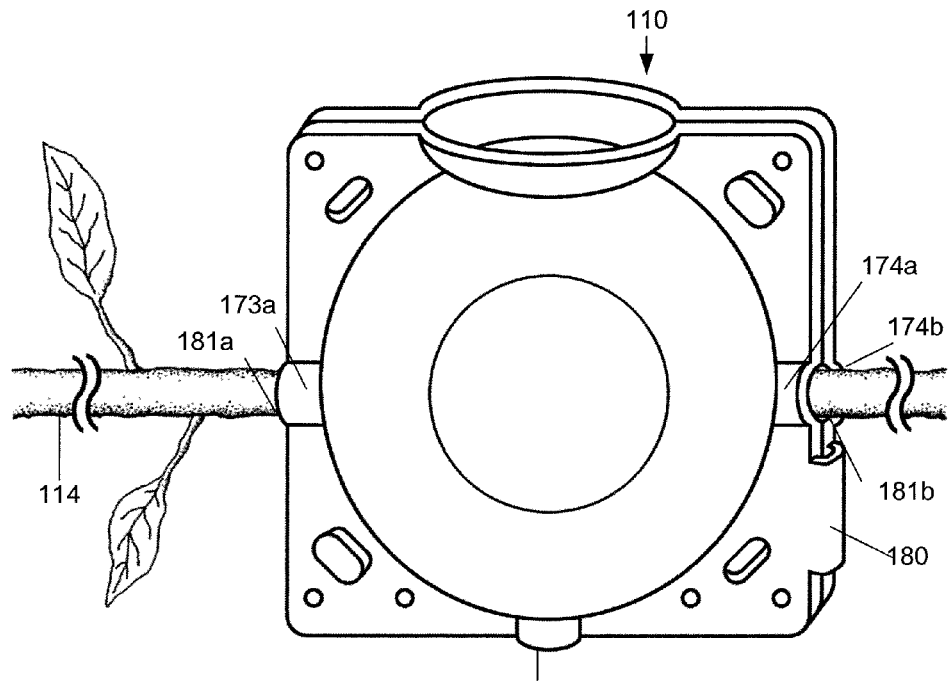
FIG. 24 is a view of the embodiment of FIG. 17 enclosing a branch passing laterally through the shell.

The side openings 181a and 181b may be sized to snugly encompass the branch 114 passing laterally through the air rooting shell 110 when the shell 110 is closed around the branch 114 (as depicted in FIG. 24). The side openings 181a and 181b may additionally have knock-out tabs 32 as described with reference to FIG. 12 above.

A bottom opening 133 is disposed on the bottom side edge 131. The bottom opening 133 is generally circular in the illustrated embodiment and described further with reference to FIG. 20 below.

In this embodiment, the first shell half 111 and the second shell half 112 are joined at the hinge side edge 130 by a hinge 180. The hinge 180 is integral with the corner flanges 119 and 123 in this embodiment, and comprises resilient material that may be folded to form the hinge 180. In this regard, the shell 110 may be formed from a resilient or semi-resilient material, such as plastic, in which the hinge 180 is foldable to mate the shell halves 111 and 112 together. Although this embodiment depicts only one hinge 180, other embodiments may have multiple hinges 180 along an edge, including either open side edge 129 or hinge side edge 130 or the bottom side edge 131. The hinge 180 allows the shell 110 to be opened and closed like a book to facilitate placing the air rooting shell 110 around the branch 114.

When the air rooting shell 110 encompasses a branch 114 passing through both the top opening 141 and the bottom opening 133, the air rooting shell 110 may be supported by a base 190. The base 190 has a plurality of supports 191 linked together by a cinch 193. The supports 191 are spaced around the branch 114 to support the bottom edge 131 of the air rooting shell 110. In the embodiment shown, each support 191 also has a flange 192 to provide extra stability to the air rooting shell 110. However, flanges 192 are not included each embodiment of the base 190. The base 190 and its method of attachment are further discussed with reference to FIG. 18 below.

FIG. 18 depicts the air rooting shell 110 partially open. The first shell half 111 has a rear surface 176a (FIG. 19) and the second shell half has a rear surface 176b. The shell halves 111 and 112 and further depicts a series of tabs and depressions in corner flanges 117-124 which fasten the first shell half 111 to the second shell half 112. In this embodiment, tab 182 protrudes from the rear surface 176a (FIG. 19) of the first shell half 111 at corner flange 117. A corresponding depression 186 is recessed into the rear surface 176b of the second shell half 112 at corner flange 121. When the first shell half 111 and the second shell half 112 are aligned and joined, tab 182 engages depression 186 to fasten the shell halves 111 and 112 together. Similarly, tab 184 protruding from corner flange 119 of the first shell half 111 engages with a depression 188 (shown in FIG. 20) in corner flange 123 (shown in FIG. 21) of the second shell half 112.

A depression 183 recessed into the rear surface 176a (FIG. 19) of the corner flange 118 of the first shell half 111 engages with a tab 187 (FIG. 19) protruding from the rear surface 176b of the corner flange 122 of the second shell half 112. Similarly, depression 185 recessed into the rear surface 176a (FIG. 19) of the corner flange 120 of the first shell half 111 engages with a tab 189 (FIG. 19) protruding from the rear surface 176b (FIG. 19) of the corner flange 124 (FIG. 19) of the second shell half 112.

The illustrated embodiment depicts the first shell half 111 as having both tabs 182 and 184 and depressions 183 and 185 on the rear surface 176a. In other embodiments, the first shell half 111 may have only tabs or only depressions, and the second shell half 112 would have only corresponding depressions or tabs, respectively. Also, while the depicted embodiment has four sets of tabs and depressions in the air rooting shell 110, other embodiments may employ more or fewer sets of tabs and depressions, so long as the tabs and depressions suffice to fasten to first shell half 111 to the second shell half 112.

The reservoir 137 is fowled when the shell halves 111 and 112 are mated together. In this regard, the reservoir is a hollow interior space that encloses rooting medium 82 (FIGS. 12 and 24) and the branch 114.

The base 190 is depicted as partially constructed prior to attachment to the branch 114. The supports 191 are linked together by the cinch 193. The cinch has a ribbed tail 194 and a head 195 capable of one-way locking to lock the tail 194 as it is pulled through the head 195. In the embodiment shown, the cinch 193 passes through openings 196 in each support 191 to attach the base 190 to the branch 114. However, the cinch 193 may alternatively pass around the outside of each support 191 or engage the supports 191 in some other manner, without departing from the scope of the present disclosure.

To attach the base 190 to the branch 114, the supports 191 are arranged about the branch as desired. Then the cinch tail 194 is pulled through the head 195 until the supports 191 are fixed and stable against to the branch 114. Because the tail 194 can only be pulled in one direction through the head 195, the cinch 193 locks the supports against the branch 114. The air rooting shell 110 may then be closed around the branch 114 and supported on the base 190.

Figure 19:
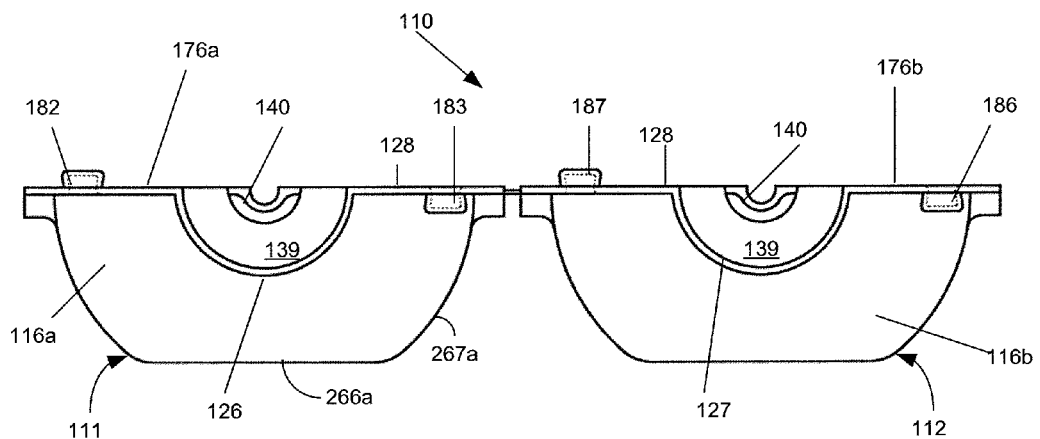
FIG. 19 is a top plan view of the embodiment of FIG. 17 with the shell fully opened.

FIG. 19 is a top plan view of the air rooting shell 110 when fully opened, before it is installed on the branch (not shown). Tab 182 protrudes from the rear surface 176a of the first shell half 111. Depression 183 is recessed into the surface 176a of the shell half 111. Tab 187 protrudes from the rear surface 176b of the second shell half 112. Depression 186 is recessed within the rear surface 176b of the second shell half 112.

A curved edge 126 extends in a semi-circle along the top side edge 128 of the first shell half 111 in the illustrated embodiment. A substantially similar curved edge 127 extends in a semi-circle along the top side edge 128 of the second shell half 112. When the shell 110 is closed, the curved edges 126 and 127 define the generally circular lip 115 (FIG. 17) for funneling water into the reservoir 137 (FIG. 18). The curved edges 126 and 127 are substantially similar in this embodiment, but it is understood that they may have different shapes without departing from the scope of this disclosure.

Disposed within the circumference of the curved edges 126 and 127 on the shell halves 111 and 112 is a neck edge 140. When the first half shell 111 is mated with the second half shell 112, the neck edges 140 define a neck opening 138 with a smaller cross-sectional area than the lip 115. A tapered inner wall 139 progressively narrows from the lip 115 to the neck edge 140.

The casing 116*a* which extends outwardly from the shell half 111. The casing 116*b* extends outwardly from the shell half 112. When the first shell half 111 is mated with the second shell half 112, the casing 116*a* of the first shell half 111 and the casing 116*b* of the second shell half 112 form a hollow reservoir 137 (shown in FIG. 18) for containing the branch 114 and the rooting medium 82 (shown in FIGS. 12 and 23), as further discussed herein. The casings 116*a* and 116*b* in this embodiment comprise generally flat-sided hemispheres, though in other embodiments may be differently-shaped, such as oval, oblong, square, or polygonal. In one embodiment, the diameter of the reservoir 137 is generally four (4) inches, though other dimensions are used in other embodiments.

In the illustrated embodiment, the casing 116*a* has the appearance of a flat-sided hemisphere or bowl and comprises a generally flat side 266*a* and a convexly curved wall 267*a* which surrounds the flat side 266*a* and extends from the flat side 266*a* to the corner flanges 117-120 (FIG. 17). Casing 116*b* is substantially similar to and a mirror image of casing 116*a*. Utilizing a flat side 266*a* allows a user (not shown) to set the casing 116*a* on a generally flat surface in order to fill the reservoir 137 (depicted in FIG. 23) with grow medium or rooting medium 82 (depicted in FIG. 23).

Figure 20:
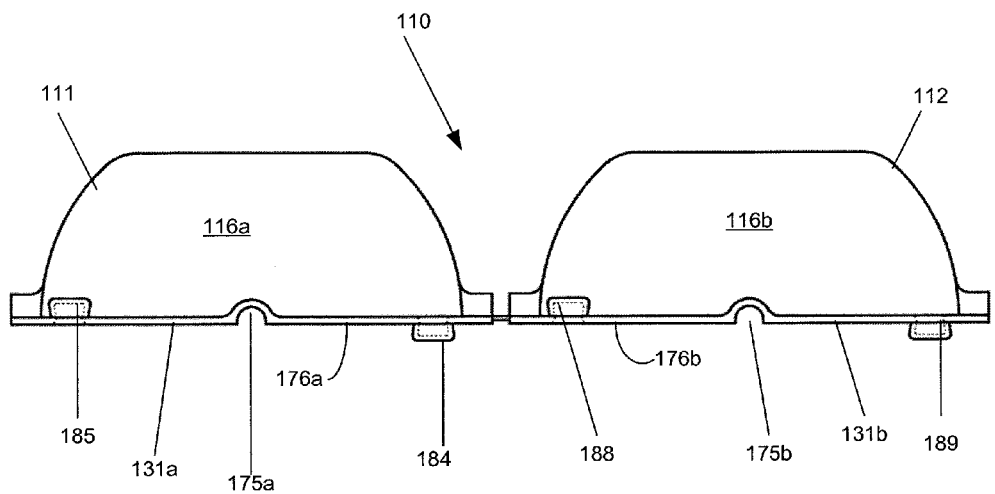
FIG. 20 is a bottom plan view of the embodiment of FIG. 19.

FIG. 20 depicts a bottom plan view of the air rooting shell 110 when fully opened. Tab 184 protrudes from the rear surface 176*a* of the first shell half 111. Depression 185 is recessed into the surface 176*a* of the shell half 111. Tab 189 protrudes from the rear surface 176*b* of the second shell half 112. Depression 188 is recessed within the rear surface 176*b* of the second shell half 112.

Disposed midway along the bottom side edge 131*a* of the first shell half 111 is a concave ridge 175*a*. A substantially similar concave ridge 175*b* is disposed midway along the bottom side edge 131*b* of the second shell half 112. When the shell halves 111 and 112 are mated together, the concave ridges 175*a* and 175*b* define a generally circular bottom opening 133. The bottom opening 133 is sized to snugly encompass the branch 114 passing through. The bottom opening 133 may further comprise petals 47 (FIG. 9) and 50 (FIG. 9) to prevent slipping, as described with reference to FIG. 9 above.

Figure 21:
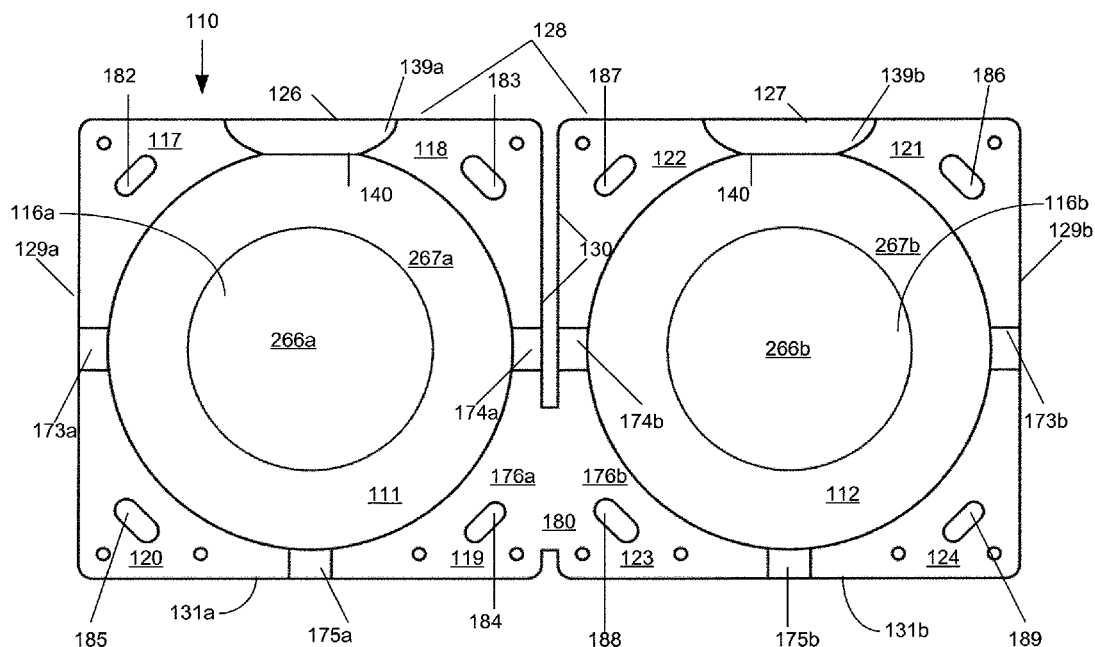
FIG. 21 is a front plan view of the embodiment of FIG. 19.

FIG. 21 is a front plan view of the shell 110 before it is closed around a branch (not shown). In this illustrated embodiment, the shell 110 is formed as one piece with shell half 111 and 112 connected by the hinge 180. The flat side 266*a* of the casing 116*a* is generally circular in the illustrated embodiment. The convexly curved wall 267*a* surrounds the flat side 266*a* and extends between the flat side 266*a* to the corner flanges 117-120. Similarly, the flat side 266*b* of the casing 116*b* is generally circular. The convexly curved wall 267*b* surrounds the flat side 266*b* and extends between the flat side 266*b* to the corner flanges 121-124. When the shell halves 111 and 112 are mated together, the casings 116*a* and 116 define the reservoir 137 (FIG. 18).

Tab 182 protrudes from corner flange 117. Depression 183 is recessed in corner flange 118. Tab 184 protrudes from corner flange 119. Depression 185 is recessed in corner flange 120. Similarly, surrounding the inner surface 135 of the second shell half 112 is the rear surface 176*b* of the four corner flanges 121-124. Depression 186 is recessed into corner flange 121. Tab 187 protrudes from corner flange 122. Depression 188 is recessed into corner flange 123. Tab 189 protrudes from corner flange 124. The corresponding tabs and depressions engage to fasten shell halves 111 and 112 as discussed herein.

Midway along the top side edge 128 of the first shell half 111 and the second shell half 112 are the curved edges 126 and 127, respectively. The curved edges 126 and 127 define the top opening 141 when the shell halves 111 and 112 are mated together. A tapered inner wall 139 progressively and concavely narrows from the curved edge 126 to the neck edge 140. The neck edge 140 is sized larger than a branch 114 (FIG. 17) to accommodate the branch 114 and also allow water (not shown) to pass through the neck opening. The neck edges 140 define the neck opening 138 between the tapered inner wall 139 and the reservoir 135. When the shell halves 111 and 112 are mated together, the tapered inner walls 139 define a general funnel shape to receive and direct water through the neck opening 138 into the reservoir 137.

On the side edges 129 and 130 of the shell halves 111 and 112 are the concave ridges 173*a*, 173*b*, 174*a*, and 174*b*. As described above with reference to FIG. 17, the concave ridges 173*a*, 173*b*, 174*a*, and 174*b* define the side openings 181*a* and 181*b* when the shell halves 111 and 112 are mated together. The shell halves are joined by the hinge 180 on the hinge side edge 130.

Along the bottom side edge 131 of the shell halves 111 and 112 are the concave ridges 175*a* and 175*b*, respectively. In the illustrated embodiment, the concave ridges 175*a* and 175*b* are each generally semi-circular. When the shell halves 111 and 112 are mated together, the concave ridges 175*a* and 175*b* define the generally circular bottom opening 133.

Figure 22:
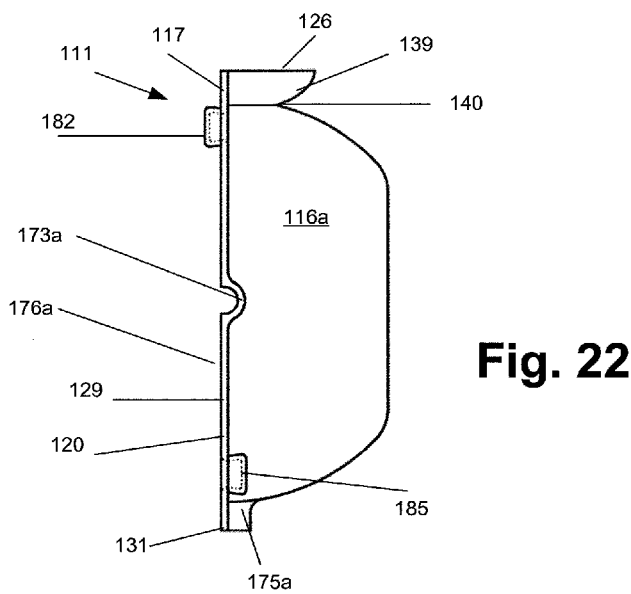
FIG. 22 is a side plan view of the embodiment of FIG. 19.

FIG. 22 is a side plan view of the shell 110 of FIG. 17. The curved edge 126 extends outwardly from the rear surface 176*a* and progressively narrows to the neck edge 140 to receive and direct water into the reservoir 137 (FIG. 18) defined by the casings 116*a* and 116*b* (FIG. 21).

The concave ridge 173*a* is midway down the open side edge 129. The concave ridge 173*a* in this embodiment has a generally semicircular cross-sectional shape, but the concave ridge 173*a* may have any cross-section shape to snugly receive a branch 114. The concave ridge 175*a* is along the bottom side edge 131.

The tab 182 protrudes from the rear surface 176*a* of corner flange 117. The depression 120 is recessed in rear surface 176*a* the corner flange 120.

Figure 23:
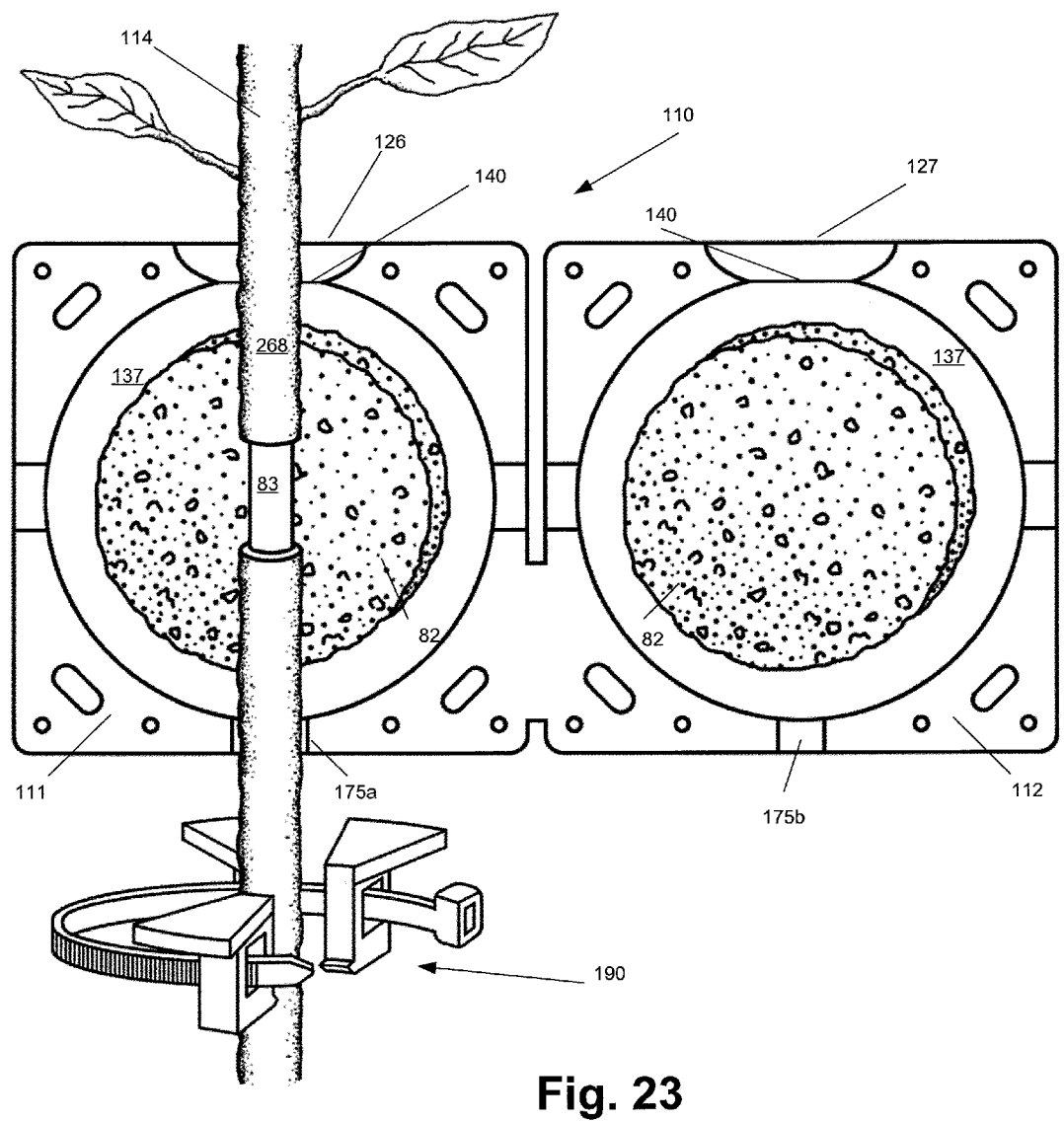
FIG. 23 is a view of the embodiment of FIG. 17 in position for closing and fastening around a branch.

FIG. 23 depicts the air rooting shell 110 fully open prior to being folded around the branch 114. The reservoir 137 is filled with a rooting medium 82. The outer bark 268 of the branch 114 has been removed to expose a scored portion 83. The branch 114 is placed along a central vertical axis of the shell 110 and passes through the curved edge 126, the neck edge 140, and the concave ridge 175*a*. The neck edge 140 has a diameter slightly wider than the branch 114 to allow water to be directed through the neck opening 138 (FIG. 17) into the reservoir 137. The concave ridges 175*a* and 175*b* defining the bottom opening 133 snugly encompass the branch 114 while allowing water to pass from the bottom of the air rooting shell 110. Alternatively, petals 47 and 50 (FIG. 9), or some other mechanism for sealing the reservoir 137 from leaking may be used without departing from the scope of the present disclosure. The air rooting shell 110 is bent at the hinge 180 to close the shell and engage the tabs and depressions as described above, thereby mating the first shell half 111 to the second shell half 112.

The base 190 is shown prior to being fastened to the branch 114. The base is described in further detail with reference to FIG. 18 above.

FIG. 24 depicts the air rooting shell 110 closed around a branch 114 passing laterally through the side openings 181a and 181b. The concave ridges 173a, 173b (not shown), 174a, and 174b define side openings 181a and 181b that snugly encompass the branch 114. When the air rooting shell 114 is employed with a lateral branch 114, the base 190 is typically not used in conjunction with the shell 110.

Figure 25:
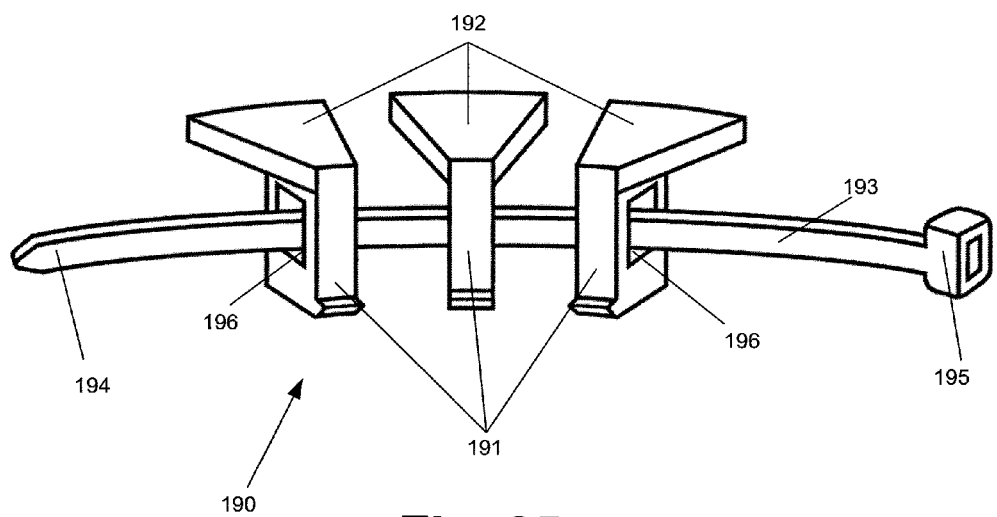
FIG. 25 is a view of the unassembled base.

FIG. 25 shows the unassembled base 190. The base comprises a cinch 193 with a plurality of supports 191. Each support 191 has a generally horizontal flange 192 extending away from the top of the support 191 to provide a supporting platform for the air rooting shell 110 (not shown). The base 190 is fastened to the branch 114 in the manner described with reference to FIG. 18 above.

Figure 26:
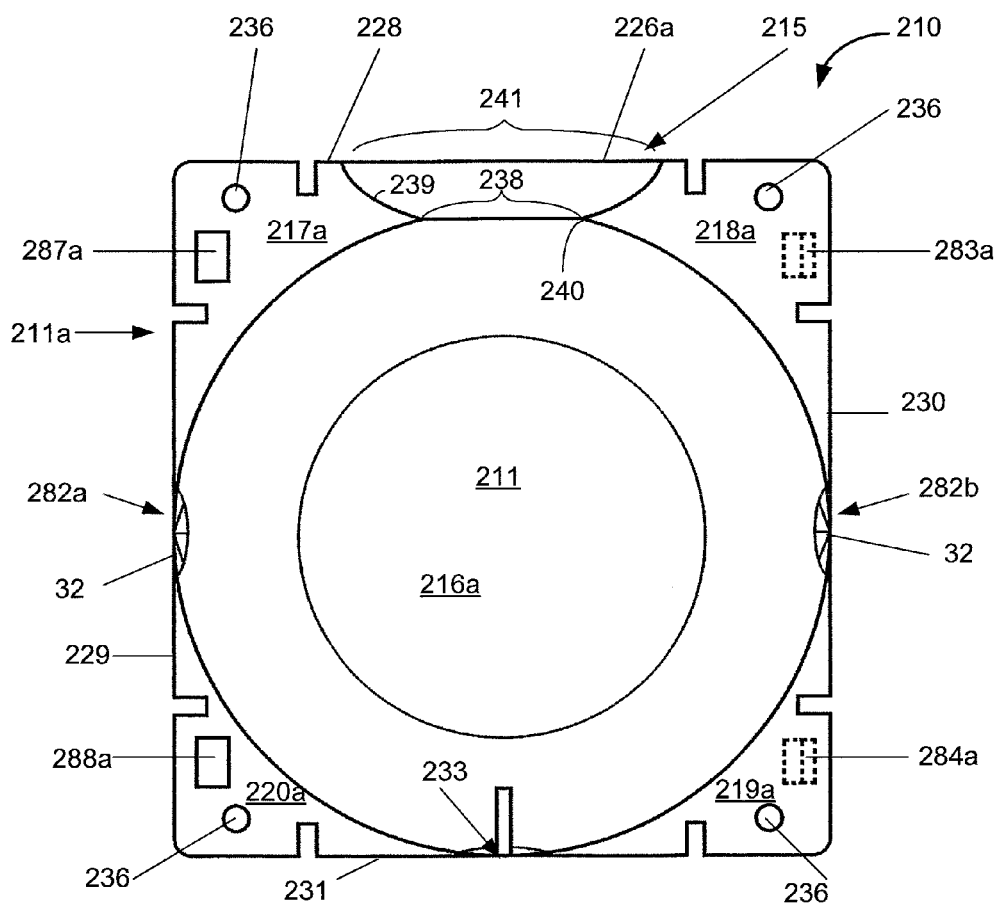
FIG. 26 is a front plan view of a first shell half of another embodiment of the air rooting shell.

FIG. 26 depicts a frontal plan view of the first shell half 211a of another embodiment of an air rooting shell 210. In this embodiment, the first shell half 211a and second shell half 211b (depicted in FIG. 28) of the air rooting shell 210 are separate parts rather than molded together as a single sheet. The first shell half 211a and the second shell half 211b are substantially similar to one another and fit and latch together to form the shell 210. Because shell halves 211a and 211b are substantially similar, the shell halves 211a and 211b are interchangeable, i.e., batches of virtually identical shell halves may be manufactured, and any two will mate together to form a shell 210.

The first shell half 211a comprises a casing 216a extending outwardly from the first shell half 211a. The shell half 211a has a top side edge 228, a first lateral side edge 229 and second lateral side edge 230, and a bottom side edge 231. The top side edge 228 and the bottom side edge 231 are generally parallel to each other in the illustrated embodiment. The lateral side edges 229 and 230 are also generally parallel to each other in the illustrated embodiment. The lateral side edges 229 and 230 are generally perpendicular to the top side edge 228 and the bottom side edge 231 in the illustrated embodiment.

The first shell half 211a comprises corner flanges 217a-220a. In the illustrated embodiment, the corner flanges 217a-220a are flat co-planar flanges located at the four corners of the first shell half 211a. In this regard, corner flange 217a is formed at the intersection of the top side edge 228 and the first lateral side edge 229. The corner flange 218a is formed at the intersection of the top side edge 228 and the second lateral side edge 230. The corner flange 219a is formed at the intersection of the second lateral side edge 230 and the bottom side edge 231. The corner flange 220a is formed at the intersection of the bottom side edge 231 and the first lateral side edge 229.

Figure 29:
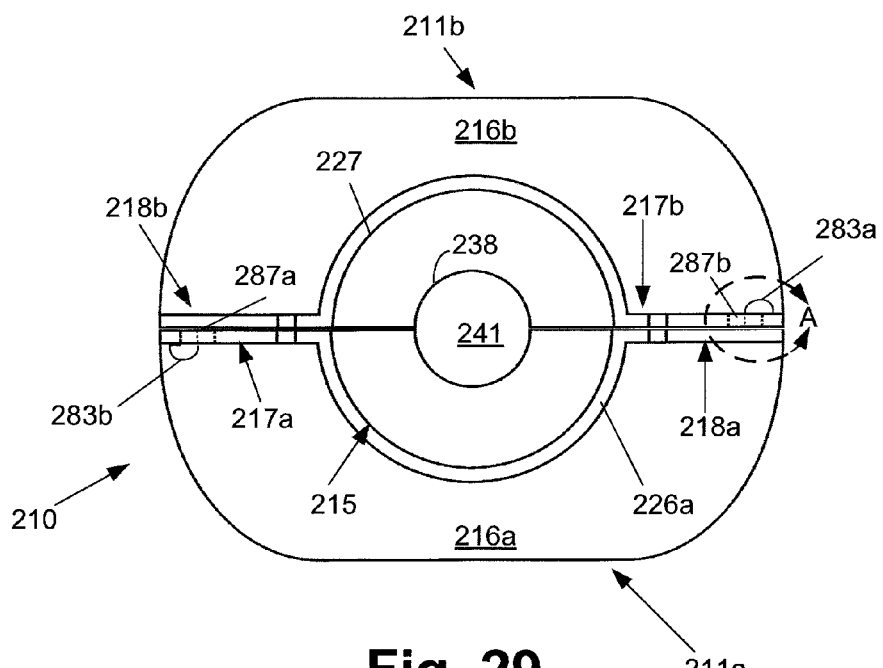
FIG. 29 is a top plan view of both shell halves of the embodiment of FIG. 26 after they are attached.
Figure 30:
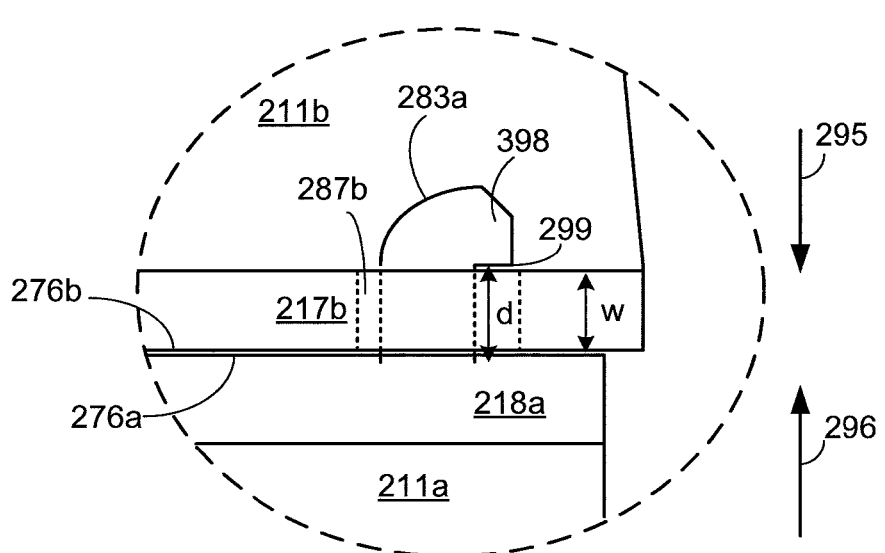
FIG. 30 is an enlarged detail view of the shell of FIG. 29, taken along detail line "A" of FIG. 29 before the shell halves are fully mated.

The corner flanges 217a-220a are integral with and substantially surround the casing 216. The corner flanges 217a-220a contact and align with substantially similar corner flanges 217b-220b of the second shell half 211b (as depicted in FIGS. 28-30).

FIG. 26 also depicts latches 283a in corner flange 218a, latch 284a in corner flange 219a, aperture 287a in corner flange 217a, and aperture 288a in corner flange 220a. The apertures 287a and 288a are substantially rectangular openings extending through the corner flanges 217a and 220a, respectively. The latches 287a and 288a and apertures 283a and 284a are further discussed with reference to FIGS. 27-29 below.

Support holes 236 are disposed in the extremity of each corner flange 217a-220a in the illustrated embodiment. These may be used to secure the air rooting shell 210 in the manner described above in reference to FIG. 16. Other embodiments do not include support holes 236.

Figure 27:
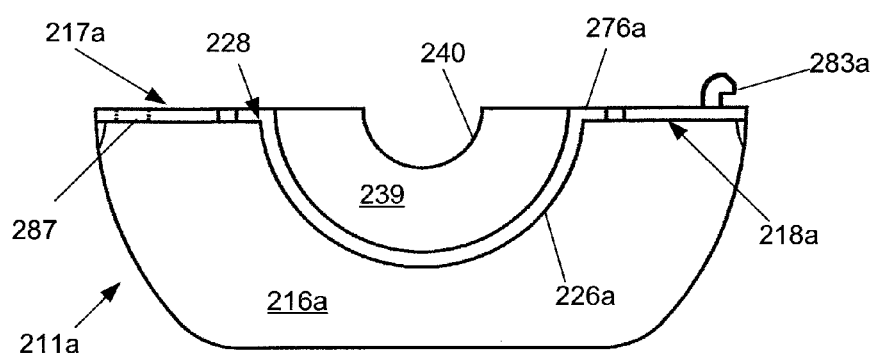
FIG. 27 is a top plan view of the first shell half of the embodiment of FIG. 26.
Figure 28:
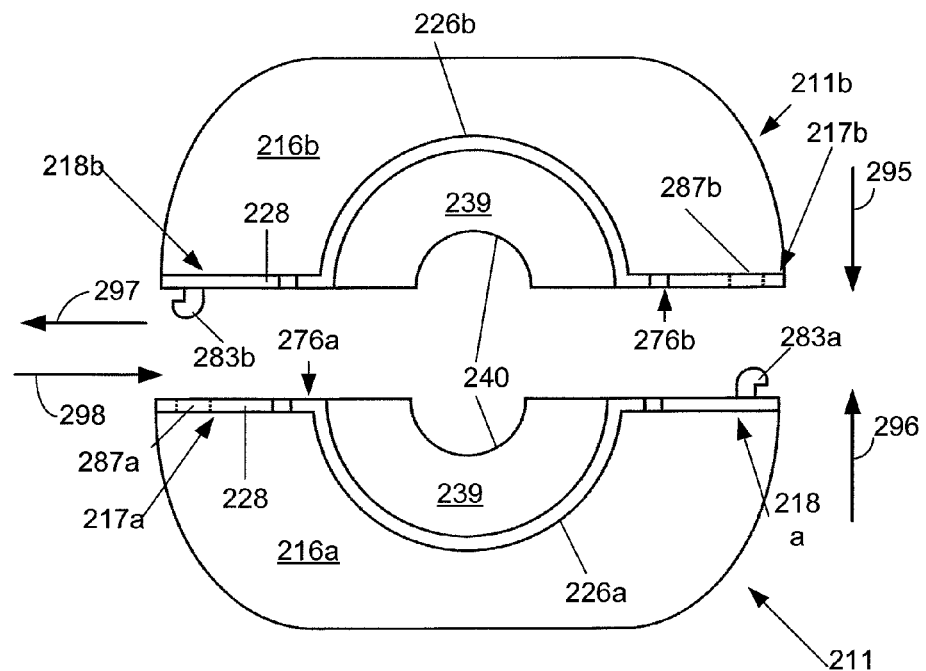
FIG. 28 is a top plan view of both shell halves of the embodiment of FIG. 26 prior to attachment.

The top side edge 228 comprises a curved edge 226a on the first shelf half 211a and a substantially similar curved edge 226b (FIG. 28) on the second shell half 211b (FIG. 28). The curved edges 226a and 226b form a circular lip 215 defining a top opening 241 when shell halves 211a and 211b are mated. Disposed within the circumference of the lip 215 is neck edge 240 defining a neck opening 238 having a smaller cross-sectional area than the top opening 241. A tapered inner wall 239 progressively narrows from the curved edge 226a to the neck edge 240. The top side edge 228 and lip 215 are further discussed with reference to FIG. 27 below.

Side openings 282a and 282b are disposed on the lateral side edges 229 and 230, respectively, of the shell 210. The side openings 282a and 282b are created by removing the knock-out tabs 32, as discussed above with reference to FIGS. 7 and 12. Although the side openings 282a and 282b in this embodiment are shown as circular, they may form other cross-sectional shapes, such as an oval, square, or polygon. The side openings 282a and 282b in this embodiment are disposed midway along the lateral side edges 229 and 230, respectively, but the side openings 282a and 282b may be disposed at different locations along the lateral side edges 229 and 230 without departing from the scope of the present disclosure. The side openings 282a and 282b may be sized to encompass the branch (not shown) passing laterally through the air rooting shell 210 when the shell 210 is closed around the branch.

A bottom opening 233 is disposed on the bottom side edge 231. The bottom opening 233 is generally circular in the illustrated embodiment and sized to encompass a branch (not shown).

FIG. 27 depicts a top plan view of the first shell half 211a. The curved edge 226a extends in a semicircular manner outward from the top side edge 228. The neck edge 240 has a smaller arc length than the curved edge 226a. The tapered inner wall 239 extends between the neck edge 240 and the curved edge 226a.

The first shell half 211a has a rear surface 276a formed by the corner flanges 217a-220a. Similarly, the second shell half 211b has a rear surface 276b formed by the corner flanges 217b-220b (depicted in FIGS. 28-29).

Latch 283a protrudes outwardly from the rear edge 276a of corner flange 218a, and aperture 287a extends through corner flange 217. Though not shown in FIG. 27, latch 284a (FIG. 26) protrudes from the rear face of corner flange 219a in a manner substantially similar to latch 283a; aperture 288a extends through corner flange 220a in a manner substantially similar to aperture 287a.

Each aperture 287a, 288a (FIG. 26) comprises a generally rectangular opening extending through the shell half 211a. Each latch 283a-284a (FIG. 26) comprises a rigid L-shaped member protruding substantially perpendicularly from the rear surface 276a. The distance between the rear surface 276a and a bottom end of the latch 283a is slightly greater than the thickness of the corner flanges 217a-220a. The apertures are thus sized to allow the latches 283a to pass through snugly and latch, as further described herein.

FIG. 28 depicts a top plan view of the shell halves 211a-211b prior to attachment. In this embodiment, the second shell half 211b is a substantially similar to the first shell half 211a, and the two halves are mated together to form the shell 210 (FIG. 29). The curved edge 226b of the second shell half 211b extends in a semicircular manner outward from the top side edge 228. The neck edge 240 has a smaller arc length than the curved edge 226b. The tapered inner wall 239 extends between the neck edge 240 and the curved edge 226b. The second shell half 211b has a rear surface 276b formed by the corner flanges 221-224 (corner flanges 223-224 not shown).

The latch 283b protrudes from corner flange 218b at a location aligned with the aperture 287a on corner flange 217a. Aperture 287b on corner flange 217b aligns with latch 283a on corner flange 218a. Although not illustrated in FIG. 28, latch 284a and aperture 288a are substantially similar to the other latches and apertures described with respect to FIG. 28.

To construct the air rooting shell 210, the user (not shown) first sets each shell half 211a-211b on a flat surface (not shown) and fills the interior with rooting medium (not shown). If expandable rooting medium is used, water may be applied at this stage so that the rooting medium expands to fill the shell halves 211a and 211b. The user then engages the shell halves 211a-211b by facing the rear surface 276a of first shell half 211a toward the rear surface 276b of the second shell half 211b around the branch (not shown) and moving them toward each other, as depicted by arrows 295 and 296. During engagement of the first shell half 211a with the second shell half 211b, the latch 283a passes through the corresponding aperture 287b and the latch 283b passes through the corresponding aperture 287a. Although not shown in FIG. 28, the lower latches (284a (FIG. 26), and the substantially similar latch 284b (not pictured)) on the first and second shell halves 211a and 211b pass through the corresponding apertures (288a (FIG. 26) and the substantially similar aperture 288b (not pictured)) at the same time.

After the latches have passed through the apertures, the surface 276a contacts the surface 276b. The user then slides shell half 211a laterally in the direction of arrow 298 while simultaneously sliding shell half 211b in the opposite lateral direction of arrow 297. This causes the end of the L-shaped latches to slide into contact with and lock against the rear surfaces 276a and 276b, thereby mating the shell halves 211a and 211b, as further discussed herein.

FIG. 29 depicts a top plan view of the locked air rooting shell 210. Here, latches 283a and 283b have passed through apertures 287a and 287b, respectively. Protrusions at the ends of the latches 283a and 283b extend beyond the apertures and compressively engage the corner flanges 217a-218a and 217b-218b. (Although the lower latches and flanges are not shown in this figure, it is understood they are substantially similar to the upper latches and flanges.) As the plant or branch (not shown) grows inside the air rooting shell 210 and the grow medium (not shown) expands, pressure increases inside the air rooting shell 210. This expansion would urge the shell halves 211a and 211b to open, but the latches restrain the movement of the corner flanges, thereby keeping the air rooting shell 210 closed.

FIG. 29 also depicts the curved edges 226a and 226b defining the generally circular lip 215 for funneling water through the neck 241 into the reservoir (not shown).

FIG. 30 is an enlarged detail view of the shell 210 of FIG. 29, taken along detail line "A" of FIG. 29 before the shell halves 211a and 211b are fully mated. In this view, the latch 283a has passed through the aperture 287b as the shell half 211a has been moved in the direction of directional arrow 296 while the shell half 211b has been moved in the direction of directional arrow 295, until the surfaces 276a and 276b meet. The aperture 287b is sized wider than the latch 283a to permit a protrusion 398 extending at a right angle from the latch 283a to clear the flange 217b. In this regard, the distance "d" between a bottom edge 299 of the protrusion 398 and the surface 276b is larger than a width "w" of the flange 218a.

Figure 31:
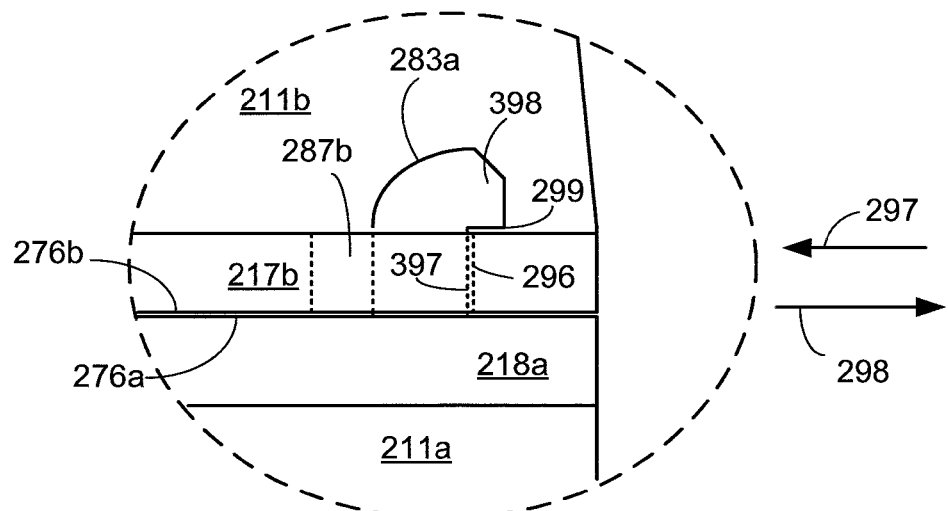
FIG. 31 is an enlarged detail view of the shell of FIG. 29, taken along detail line "A" of FIG. 29 after the shell halves are fully mated

Although only one of the four (4) latches on the shell 210 is described in detail in FIGS. 30 and 31, it is understood that all of the latches are substantially similar and function in an identical manner simultaneously.

FIG. 31 is an enlarged detail view of the shell 210 of FIG. 29, taken along detail line "A" of FIG. 29 after the shell halves 211a and 211b are fully mated. In this view, the shell half 211a has been moved in the direction of directional arrow 298 while the shell half 211b has been moved in the direction of directional arrow 297 until an outermost edge 397 of the latch contacts an outermost wall 296 of the aperture 287b. In this fully latched configuration, the shell halves 211a and 211b are prevented from opening by contact of the bottom edge 299 of the latch 283b with the flange 217b. In other words, any pressure from within the shell 210 urging the shell halves 211a and 211b will increase the pressure of the bottom edge 299 of the latch on the flange 217b which will maintain the shell halves 211a and 211b together.

Figure 32:
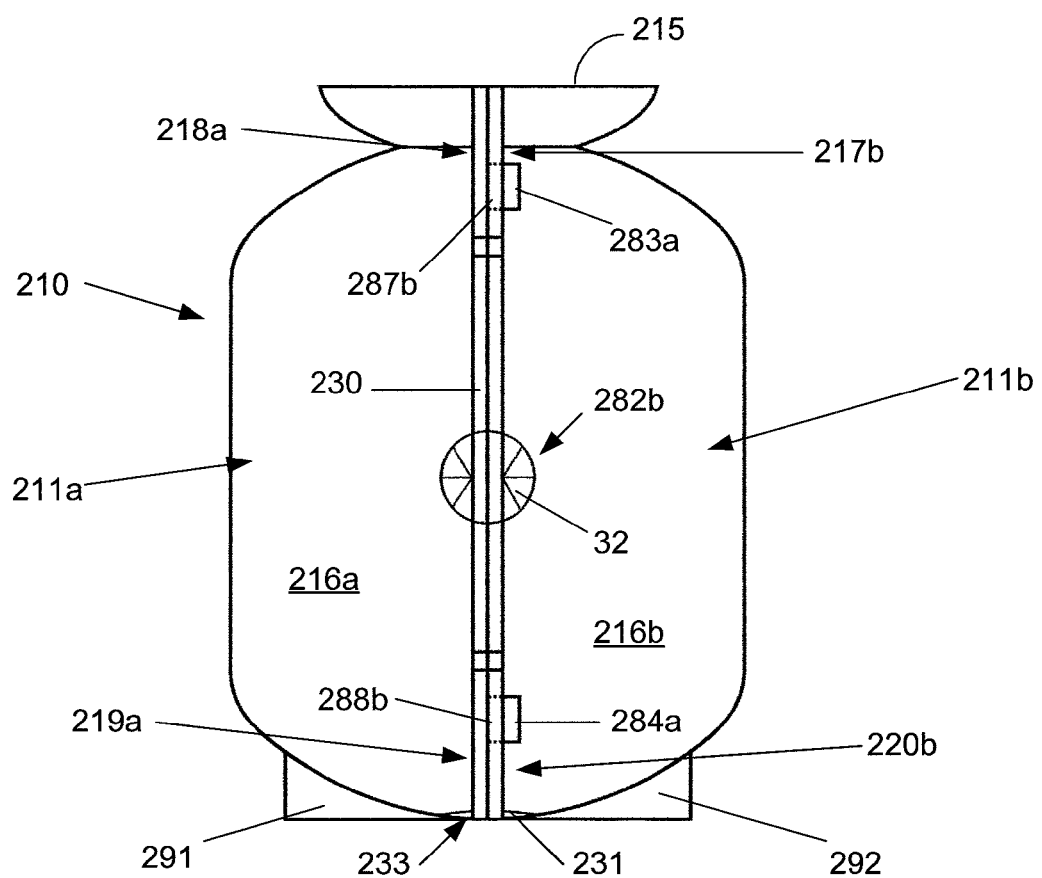
FIG. 32 is a side plan view of the air rooting shell of embodiment of FIG. 26.

FIG. 32 depicts a lateral side plan view of the closed air rooting shell 210. The view depicts corner flanges 218a and 219a of the first shell half 211a aligned with corner flanges 217b and 220b, respectively, of the second shell half 211b. Knock-out tabs 32 enclose the side opening 282b along the second lateral side edge 230. The bottom opening 233 is shown on the bottom side edge 231. The lateral flanges 291 and 292 extend outward along the bottom of the shell casings 116a and 116b, respectively, to provide stability and support should the user decide to set the rooting shell 210 on a flat surface (not shown). Latch 283a on corner flange 218a aligns with and passes through aperture 287b of corner flange 217b. Latch 284a on corner flange 219a aligns with and passes through aperture 288b of corner flange 220b.

As described above and shown in the associated drawings, the present invention comprises an air rooting shell. While particular embodiments of the invention have been described, it will be understood, however, that the invention is not limited thereto, since modifications may be made by those skilled in the art, particularly in light of the foregoing teachings. It is, therefore, contemplated by the appended claims to cover any such modifications that incorporate those features or those improvements that embody the spirit and scope of the present invention.

What is claimed is:

1. An apparatus comprising:
   a first shell half mateable with a second shell half to form a shell, the shell comprising
      a reservoir, and
      a top side edge with an upper lipped opening for receiving a branch, the upper lipped opening comprising
         a flared lip for receiving water,
         a narrowed neck opening for enclosing around a branch, and
         a tapered inner wall progressively narrowing from the flared lip to the narrowed neck opening,
   the first shell half and the second shell half each comprising
      a substantially concave shell casing.

2. The apparatus of claim 1, wherein the first shell half and the second shell half are substantially mirror-imaged when joined to form the shell.

3. The apparatus of claim 1, further comprising a bottom opening sized to snugly enclose the branch and substantially aligned with the upper lipped opening.

4. The apparatus of claim 3 further comprising a base mountable to the branch and comprising
   a plurality of supports arrangeable about the circumference of the branch, and
   a cinch for binding the supports tightly to the branch.
such that the shell sits on the base when enclosing the branch.

5. The apparatus in claim 4 wherein the supports comprise flanges for stabilizing the shell.

6. The apparatus of claim 4 wherein the cinch comprises a tail and a one-way locking head, such that when the tail is threaded through the head, the tail is locked from loosening.

7. The apparatus of claim 3, wherein the bottom opening comprises a knock-out tab.

8. The apparatus of claim 1, wherein the first shell half and the second shell half are each substantially hemispherical in shape and the reservoir is substantially spherical in shape.

9. The apparatus of claim 8, further comprising a bottom opening sized to snugly receive a branch and vertically aligned with the upper lipped opening.

10. The apparatus of claim 1, wherein the first shell half and second shell half each comprise a substantially flat rear surface with a curved wall extending from the substantially flat rear surface to four corner flanges disposed in a plane around the curved wall, and wherein the four corner flanges of the first shell half contact the four corner flanges of the second shell half when the first shell half is mated to the second shell half.

11. The apparatus of claim 10 wherein a side edge of the first shell half is attached to a side edge of the second shell half by a hinge.

12. The apparatus of claim 11 wherein the first shell half comprises at least one tab protruding from the rear surface of a corner flange, and the second shell half comprises at least one depression recessed in the rear surface of a corner flange, such that the first shell half and the second shell half are mated when the tab engages the depression.

13. The apparatus of claim 11, wherein two bottom corner flanges of the first shell half are connected by a first concave ridge and two bottom corner flanges of the second shell half are connected by a second concave ridge, such that when the first shell half and second shell half are mated, the first and second concave ridges define a bottom opening in the shell.

14. The apparatus of claim 13, wherein the bottom opening is sized to snugly encompass a branch.

15. The apparatus of claim 14, wherein the first shell half comprises a third concave ridge between two side corner flanges and a fourth concave ridge between two opposing two side corner flanges, and the second shell half comprises a fifth concave ridge between two side corner flanges and a sixth concave ridge between two opposing two side corner flanges, such that when the first shell half and the second shell half are mated, the third and fifth concave ridges define a first side opening and the fourth and sixth concave ridges define a second side opening.

16. The apparatus of claim 15, wherein the side openings are disposed substantially midway along the sides of the shell.

17. The apparatus of claim 16, wherein the side openings are sized to snugly encompass a tree branch.

18. The apparatus of claim 10, wherein the first shell half comprises at least one latch extending from the rear wall of at least one corner flange, and the second shell half comprises at least one aperture disposed in a corner flange opposing the at least one latch and adapted to engage the at least one latch, such that the first shell half and second shell half are mated when the at least one latch engages the at least one opening.

19. A shell for rooting plants, the shell comprising:
a reservoir formed by a first and second shell half, the first and second shell halves substantially similar to one another and mateable to one another to form the shell, each shell half comprising a top side edge with an upper lipped opening for receiving a branch, the upper lipped opening comprising
a flared lip for receiving water,
a narrowed neck opening for enclosing around a branch, and
a tapered inner wall progressively narrowing from the flared lip to the narrowed neck opening,
each shell half further comprising a flat sided bowl for receiving rooting medium, each bowl comprising four corner flanges, two of the four corner flanges comprising apertures and two of the four corner flanges comprising latches, the apertures aligned with the latches such that when the two shell halves are mated, a latch of one shell half engages with an aperture of the other shell half in each corner of the shell to secure the first shell half to the second shell half.

20. The shell of claim 19, further comprising side openings for receiving and enclosing the branch in a lateral orientation.

* * * * *